US012320104B2

(12) United States Patent
Tracy et al.

(10) Patent No.: US 12,320,104 B2
(45) Date of Patent: Jun. 3, 2025

(54) MODULATED STREAM PATTERN SPRAY HEAD

(71) Applicant: ASSA ABLOY Americas Residential Inc., New Haven, CT (US)

(72) Inventors: Adam William Tracy, Irvine, CA (US); Oscar Romero, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 432 days.

(21) Appl. No.: 17/714,330

(22) Filed: Apr. 6, 2022

(65) Prior Publication Data

US 2022/0325507 A1 Oct. 13, 2022

Related U.S. Application Data

(60) Provisional application No. 63/172,515, filed on Apr. 8, 2021.

(51) Int. Cl.

| | |
|---|---|
| ***B05B 1/16*** | (2006.01) |
| ***B05B 1/12*** | (2006.01) |
| ***E03C 1/04*** | (2006.01) |
| ***E03C 1/084*** | (2006.01) |

(52) U.S. Cl.

CPC .............. *E03C 1/0405* (2013.01); *B05B 1/12* (2013.01); *B05B 1/169* (2013.01); *E03C 1/084* (2013.01); *B05B 1/1636* (2013.01)

(58) Field of Classification Search

CPC .......... B05B 1/12; B05B 1/169; B05B 1/1636

USPC .............................. 239/443–449, 574, 581.1

See application file for complete search history.

(56) References Cited

U.S. PATENT DOCUMENTS

| | | | | |
|---|---|---|---|---|
| 3,373,770 | A | 3/1968 | Ward et al. | |
| 7,114,515 | B2 | 10/2006 | Sponheimer et al. | |
| 8,322,377 | B2 | 12/2012 | Di Nunzio | |
| 9,545,639 | B2 * | 1/2017 | Meehan | B05B 12/0022 |
| 2008/0067264 | A1 * | 3/2008 | Erickson | B05B 1/1618 239/525 |
| 2009/0090414 | A1 | 4/2009 | Di Nunzio | |
| 2019/0224694 | A1 * | 7/2019 | Wang | B05B 12/087 |
| 2022/0243436 | A1 * | 8/2022 | Wu | E03C 1/0404 |
| 2022/0268002 | A1 * | 8/2022 | Wu | E03C 1/0405 |

* cited by examiner

*Primary Examiner* — Jason J Boeckmann

(74) *Attorney, Agent, or Firm* — Merchant & Gould P.C.

(57) ABSTRACT

An improved spray head is provided that is configured to deliver water in multiple modes including a spray mode and a stream mode, with a stream modulation control for modulating a stream pattern from an aerated stream to a cone stream to a concentrated straight beam stream. Thus, a versatile faucet is provided that can be utilized as a multi-purpose cleaning tool that can be adjusted to select a modulated water output pattern that is suited for a given activity. Accordingly, a user may be provided with a wider range of spray and stream pattern options from which the user can easily select and adjust for a customized experience that meets the needs of the user for the task at hand.

17 Claims, 28 Drawing Sheets

MODULATED STREAM PATTERN SPRAY HEAD

CROSS-REFERENCE TO RELATED APPLICATIONS

This applications claims priority to and the benefit of U.S. Provisional Patent Application No. 63/172,515, filed Apr. 8, 2021, the disclosure of which is incorporated by reference in its entirety.

TECHNICAL FIELD

This invention relates to the field of faucet spray heads. More particularly, this invention relates to a spray head for a faucet with a modulated stream output, the spray head comprising an actuating mechanism for controlling the stream output ranging from an aerated stream to a cone to a concentrated straight beam.

BACKGROUND

Faucets have varying designs and configurations. Some faucets are equipped with a spray head that is intended to improve or change the water output pattern. Further, some spray heads, such as on a kitchen faucet, may be configured as a pull-out or pull-down spray head that a user can pull from a base and extend for more efficient cleaning or rinsing. Some spray heads may include a selector to dispense water as either an aerated stream or a spray. Various water output patterns may be useful for various types of tasks. For example, an aerated stream may be useful when a straight, evenly pressured water stream is desired; a soft stream may be useful for delicate tasks, such as rinsing fruits and vegetables, cleaning raw fish, or hand washing a delicate clothing item; and a targeted forceful stream or a spray pattern may be useful for more difficult cleaning tasks, such as removing stubborn baked-on food or clearing thick or sticky substances from a blender. A control for modulating a flow of water between output patterns would be helpful. Accordingly, there is a need for an improved spray head that dispenses water in multiple modes including a spray mode and a stream mode with a controller for modulating the stream pattern.

SUMMARY

The present disclosure relates generally to an improved spray head that delivers water in multiple modes including a spray mode and a stream mode, with an actuator control for modulating a stream pattern from an aerated stream to a cone to a concentrated straight beam. Thus, a versatile faucet is provided that can be utilized as a multi-purpose cleaning tool that can be easily and dynamically adjusted during use to select a modulated water output pattern that is suited for a given activity. Accordingly, a user may be provided with a wider range of spray and stream pattern options from which the user can easily select and adjust for a customized experience that meets the needs of the user for the task at hand.

In a first aspect, a spray head for connection to a faucet for expelling water is described. The spray head includes a stream modulation control, a mode selection control, an aerator stream flow path, a cone stream flow path, a straight beam stream flow path, and a shower spray path. The stream modulation control is configured in a normally actuated position. The mode selection control is configured in a normally unbiased position. The aerator stream flow path is configured to receive a water flow and produce an aerated stream as the water flow exits the spray head. The cone stream flow path is configured to receive the water flow in response to a first actuation force applied to the stream modulation control, and produce a cone stream as the water flow exits the spray head. A straight beam stream flow path is configured to receive the water flow in response to a second actuation force applied to the stream modulation control, wherein the second actuation force is greater than the first actuation force, and produces a straight beam stream as the water flow exits the spray head. A shower spray path is configured to receive the water flow in response to the mode selection control being moved to a biased position when the stream modulation control is in the actuated position and produces a shower spray as the water flow exits the spray head.

In another aspect, a spray head for connection to a faucet for expelling water is described. A spray head housing includes an inlet, an outlet, and an intermediate section positioned between and in fluid communication with the inlet and outlet. A movable pathway control stem is attached to a pathway control seal, and the pathway control seal has an inlet configured to receive a water flow in a passage configured to allow the water flow to exit the pathway control seal. A flow pathway disk assembly includes a first opening corresponding with an aerated stream flow path and a shower spray flow path, a second opening corresponding with a cone stream flow path, and third opening corresponding with a straight beam stream path. A first control is for selection between a shower spray mode for expelling a shower spray of water and a modulated stream mode for expelling a stream of water. A second control is for modulating between patterns of the stream of water when in the modulated stream mode and is configured to receive an actuation force from a user, wherein the actuation force causes the second control to drive movement of the pathway control stem and the pathway control seal to a first position, a second position, or a third position. The first position is where the passage of the pathway control seal is aligned with the first opening in the flow pathway disk assembly. The second position is where the passage of the pathway control seal is aligned with the second opening in the flow pathway disk assembly. The third position is where the passage of the pathway control seal is aligned with the third opening in the flow pathway disk assembly. A central manifold is positioned between the flow pathway disk assembly and a nozzle assembly, and the central manifold includes a first port, a second port, a third port, a fourth port, a diverter chamber, and a fifth port. The first port is for receiving the water flow via the first opening in the flow pathway disk assembly. The second port is for receiving the water flow via the second opening in the flow pathway disk assembly. The third port is for receiving the water flow via the third opening the flow pathway disk assembly. The fourth port is for receiving the water flow received in the first port when the first control is in an unbiased position. The diverter chamber is configured to receive a piston connected to the first control and wherein actuation of the first control to a biased position causes the piston to close the fourth port and open the fifth port. The fifth port is for receiving the water flow received in the first port when the first control is in a biased position. The nozzle assembly includes a swirl nozzle for producing a cone stream as the water flow received via the second port in the central manifold exits the outlet of the spray head, a nozzle for producing a straight beam stream as the water flow received via the second port in the central manifold exits the outlet of the spray head, an aerator subassembly for producing an aerated stream as the water flow received via the fourth port in the central manifold exits the outlet of the spray head, and a spray outlet for producing a shower spray as the water flow received via the fifth port in the central manifold exits the outlet of the spray head.

In yet another aspect, a method of expelling water via a spray head is described. The method includes receiving a water flow and directing the water flow. Directing the water flow occurs along an aerated stream flow path for producing an aerated stream as the water flow exits the spray head. In response to receiving a first actuation force applied to a stream modulation control, the water flow is directed along a cone stream flow path for producing a cone stream as the water flow exits the spray head. In response to receiving a second actuation force applied to the stream modulation control, wherein the second actuation force is greater than the first actuation force, the water flow is directed along a straight beam stream flow path for producing a straight beam stream as the water flow exits the spray head. In response to receiving a first actuation force applied to a mode selection control when an actuation force is not applied to the stream modulation control, the water flow is directed along a shower spray head path for producing a shower spray as the water flow exits the spray head.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure, and therefore, do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
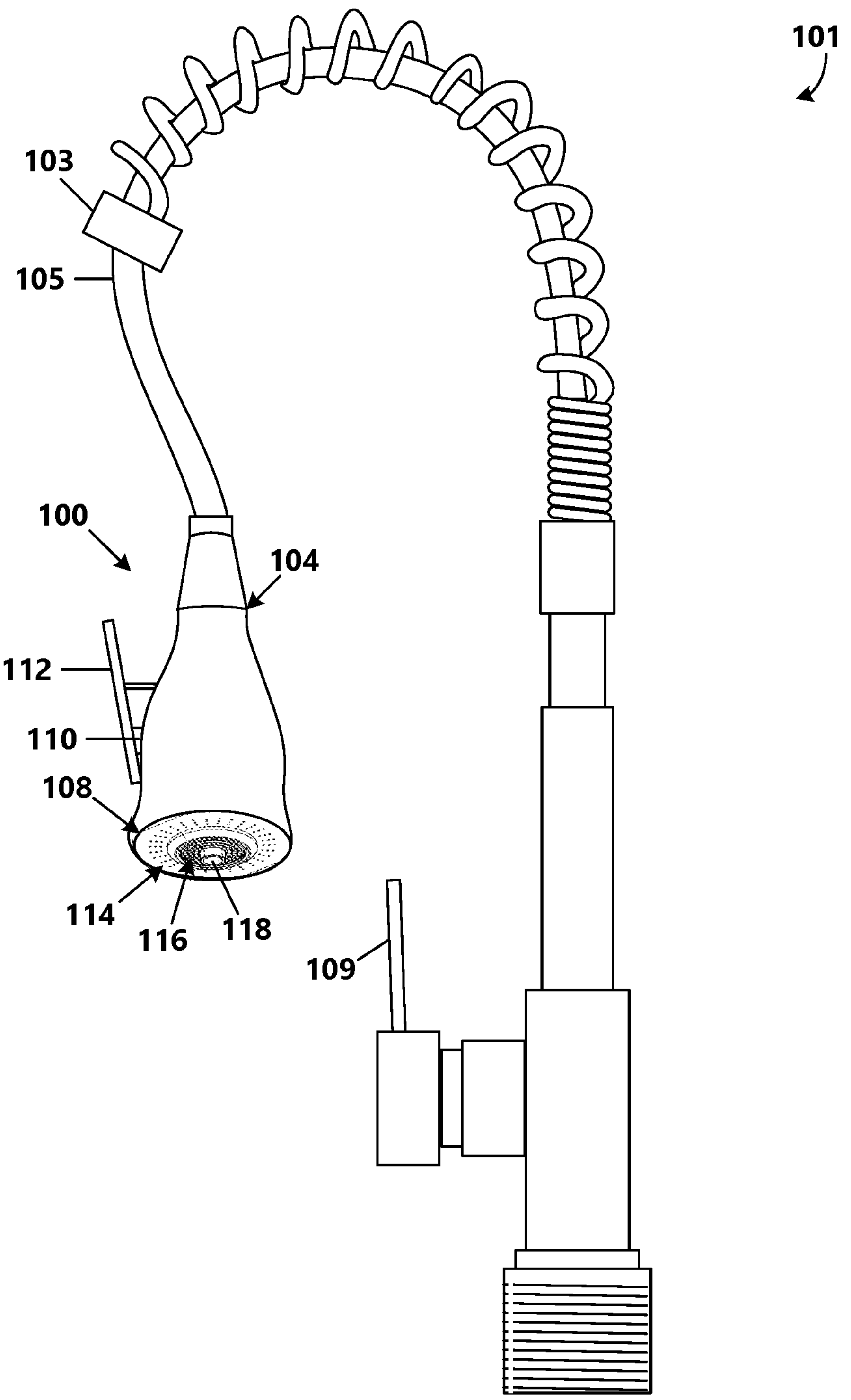
FIG. 1 illustrates a side view of a faucet with a spray head, according to an embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As briefly described above, embodiments of the present disclosure are directed to a spray head of a faucet with both spray and stream modes, the spray head including an actuator control for modulating a pattern of water between a range of stream patterns. In some examples, the stream patterns may range from an aerated stream to a cone to a concentrated straight beam stream. According to an aspect, the spray head may be dynamically adjusted during use to select a modulated water output pattern that is suited for a given activity and that meets the needs of the user for the task at hand.

FIG. 1 shows a faucet 101 including a faucet body 103 and a faucet spray head 100 that may be detached or detachable from the faucet body 103. For example, the spray head 100 may be movable away from the faucet body 103 so as to allow a user the ability to manipulate the spray head 100 during use. In various examples, an inlet 104 of the spray head 100 is configured for screw-connection to a faucet hose 105 that may be at least partially positioned within the faucet body 103. In some examples, the faucet body 103 is rigid. In other examples, at least a portion of the faucet body 103 may be flexible. The faucet hose 105 can be any of a variety of different types including, but not limited to, a nylon-braided hose, a metal braided hose, a flexible hose, a coated hose, etc. The faucet 101 is configured to dispense water from a water source out of an outlet 108 of the spray head 100. Further, the faucet 101 may be configured to be controlled (i.e., on/off, water volume, and water temperature) via traditional methods (e.g., a handle 109), and/or via gesture or voice input. Although the faucet 101 may be illustrated and discussed herein as a pull-down or pull-out kitchen faucet, aspects of the spray head 100 described herein may be implemented in other types of faucets, including but not limited to, shower faucets, bidet faucets, etc. An outer profile of the spray head 100 may have a variety of different shapes and sizes, which may provide a variety of different aesthetic configurations of the faucet 101.

According to an aspect, the spray head 100 may include a mode selection control 110 and a stream modulation control 112 positioned thereon to allow the user to toggle characteristics of the water expelled at the spray head outlet 108. In some examples, operation of the mode selection control 110 or the stream modulation control 112 may control the flow pathway of the water through the spray head 100, which may modify characteristics of the water expelled at the spray head outlet 108, such as the water output pattern. For example, operation of the mode selection control 110 may allow the user to select between a spray mode and a modulated stream mode. The spray mode may produce a shower-like spray pattern of water, and the modulated stream mode may produce a stream pattern of water. Moreover, operation of the stream modulation control 112 may cause the water output pattern to be modulated between an aerated stream, a cone stream, and a concentrated straight beam stream.

An aerated stream may include a flow of water that has been broken up into a plurality of smaller streams of water. In some examples, an aerated stream may include a mixture of water and air. For example, a user may want to dispense an aerated stream of water to produce less splash than a spray pattern of water for a given task. Alternatively, the user may want to dispense a cone stream of water. A cone stream may include a flow of water that has been swirled, such that the outflow pattern may be a circular ring of water. In some examples, the center of the ring may be hollow. In other examples, the water flow may be modulated between two stream patterns (e.g., an aerated and a cone stream or a cone and a concentrated straight beam stream) and the center of the circular ring of water may include a solid stream of water. In some cases, the user may want to dispense a forceful stream of water. Accordingly, a concentrated straight beam stream may be selected where a flow of water may be focused into a solid straight beam stream as it exits the spray head 100. In some examples, the stream modulation control 112 may have no effect on the spray pattern of water when the spray head 100 is in the spray mode.

Figure 2:
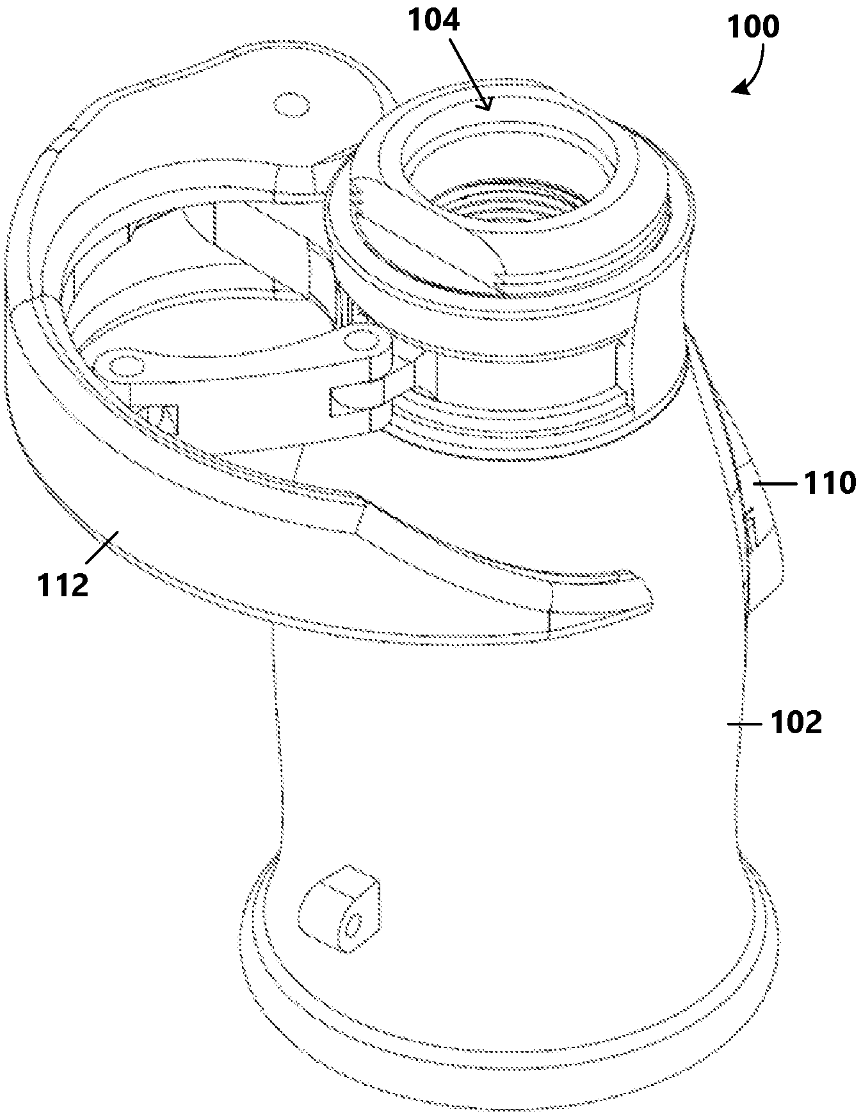
FIG. 2 illustrates a top perspective view of a spray head according to an embodiment of the present disclosure.

FIG. 2 is a top perspective view of the spray head 100 according to one example embodiment of the present disclosure. The spray head 100 generally comprises a stylized outer housing 102 with an inlet 104, an outlet 108 (shown in FIG. 1), and an internal section 106 (shown in FIG. 4) positioned between the inlet 104 and the outlet 108 and configured to house interior parts of the spray head 100, which are in fluid communication with the inlet 104 and outlet 108. In various examples, the inlet 104 of the spray head 100 is configured for screw-connection to the faucet hose 105. The spray head 100 is shown to include the mode selection control 110, for selecting between the spray mode and the modulated stream mode, and the stream modulation control 112, for modulating the output of the water (when in the modulated stream mode) between an aerated stream, a cone stream, and a concentrated straight beam stream. In FIG. 2, the illustrated embodiment of the mode selection control 110 is shown implemented as a button positioned along a side of the spray head 100. According to one example implementation, the mode selection control 110 may normally be in an unbiased position, which corresponds with the modulated stream mode. When the mode selection control 110 is actuated or depressed by the user, the spray mode may be selected. That is, the mode selection control 110 may be configured to receive an actuation force from the user, which when received, may drive operation of the spray head 100 to provide a spray output, and when released, may drive operation of the spray head 100 to provide a stream output that may be modulated by user-actuation of the stream modulation control 112. As should be appreciated and as will be described in further detail below with respect to other example embodiments, other configurations of the mode selection control 110 are possible and are within the scope of the present disclosure.

According to an aspect, user actuation of the stream modulation control 112 may control how a plurality of flow paths within the spray head 100 are opened or closed, which cause the flow of water to be directed between the plurality of flow paths for providing an adjustable stream pattern (e.g., between an aerated stream, a cone stream, and a straight beam stream). In FIG. 2, the illustrated embodiment of the stream modulation control 112 is shown implemented as a squeeze mechanism configured to receive an actuation force from the user. As should be appreciated and as will be described in further detail below with respect to other example embodiments, other configurations of the stream modulation control 112 (e.g., rotary, push button, push/pull device, lever) are possible and are within the scope of the present disclosure.

Figure 3:
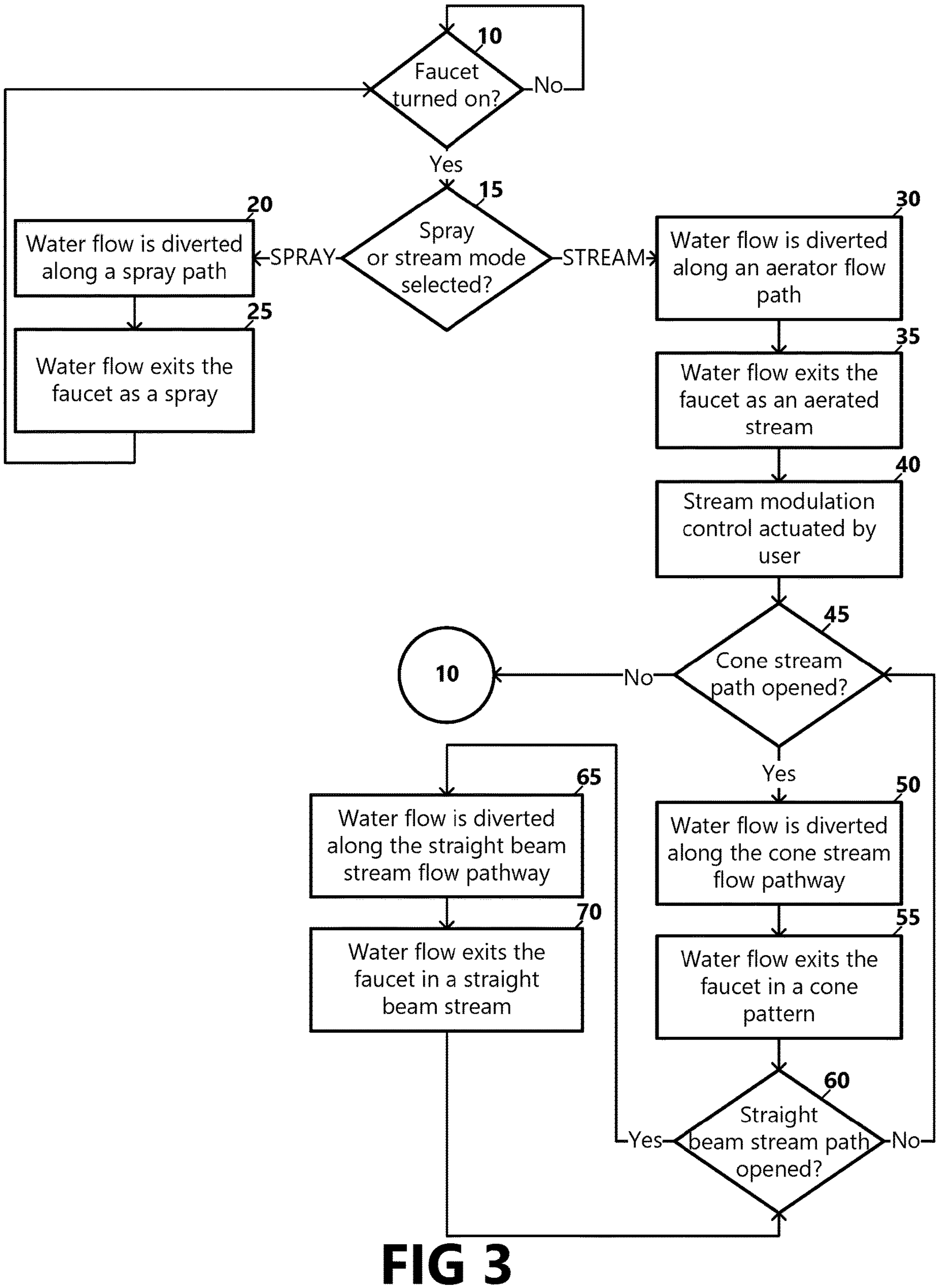
FIG. 3 illustrates a flow chart depicting general stages of an example process or method for using a spray head to modulate a flow of water between a range of stream patterns according to an embodiment of the present disclosure.

With reference now to FIG. 3, a flow chart is illustrated depicting general stages of an example process or method for using the spray head 100 to modulate a flow of water between a range of stream patterns according to an embodiment. At operation 10, the faucet 101 may be turned on. For example, the faucet 101 may be turned on via an actuation of the faucet handle 109, gesture, voice input, or via another actuation method. When the faucet 101 is turned on, water may be allowed to flow through the faucet hose 105 and into the spray head 100.

At operation 15, the spray mode or the stream mode may be selected. For example, the mode selection control 110 may be actuated by the user into a position where the spray mode is selected.

At operation 20, in response to selection of the spray mode, the flow of water may be diverted along a spray flow path within the spray head 100. For example and as will be described in further detail below, the spray head 100 may comprise a plurality of flow paths (e.g., a spray flow path, an aerated stream flow path, a cone stream flow path, and a straight beam stream flow path) through which water may be diverted based on actuation of the mode selection control 110 and/or the stream modulation control 112.

Figure 4:
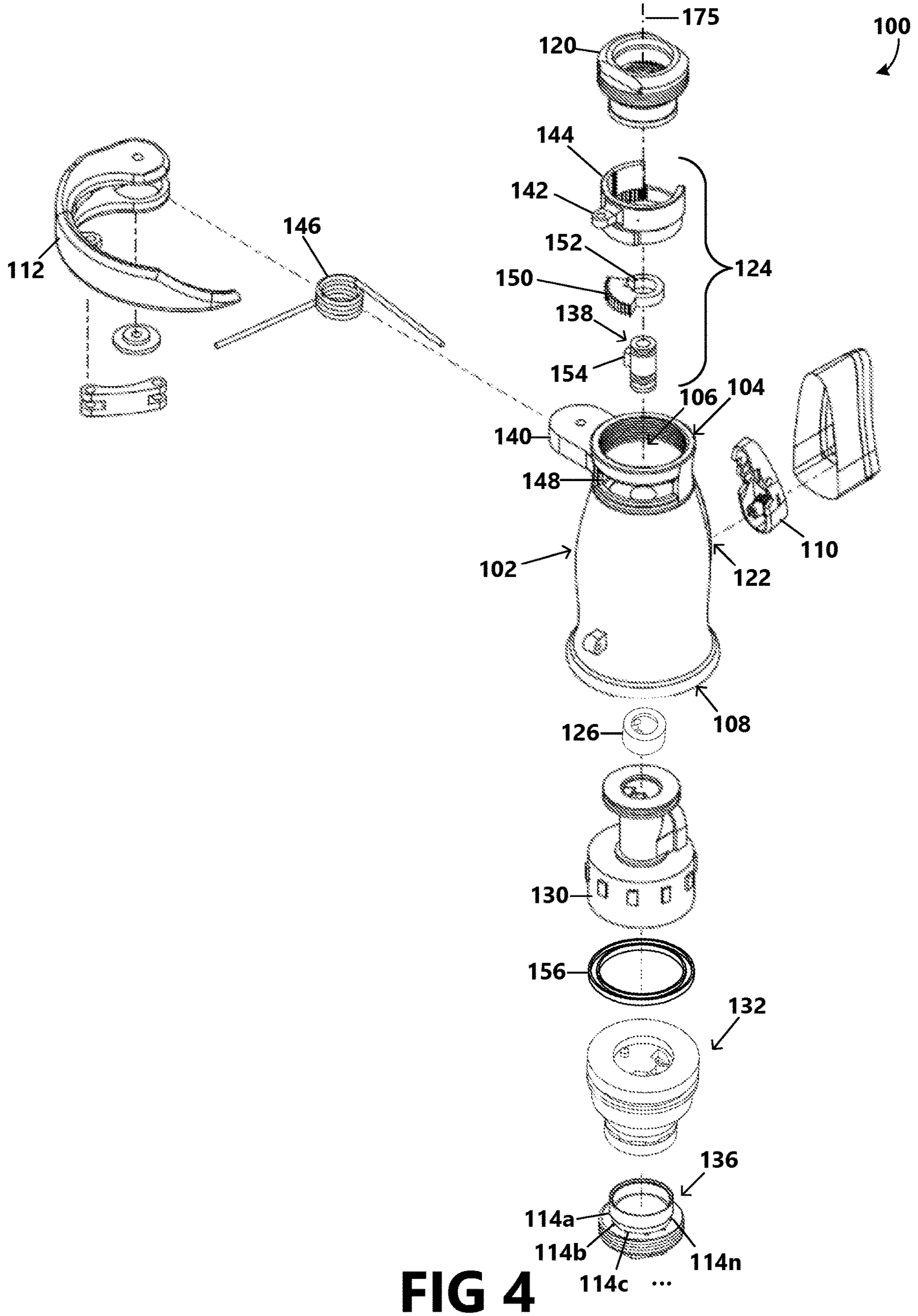
FIG. 4 illustrates an exploded view of the spray head of FIG. 2.
Figure 24:
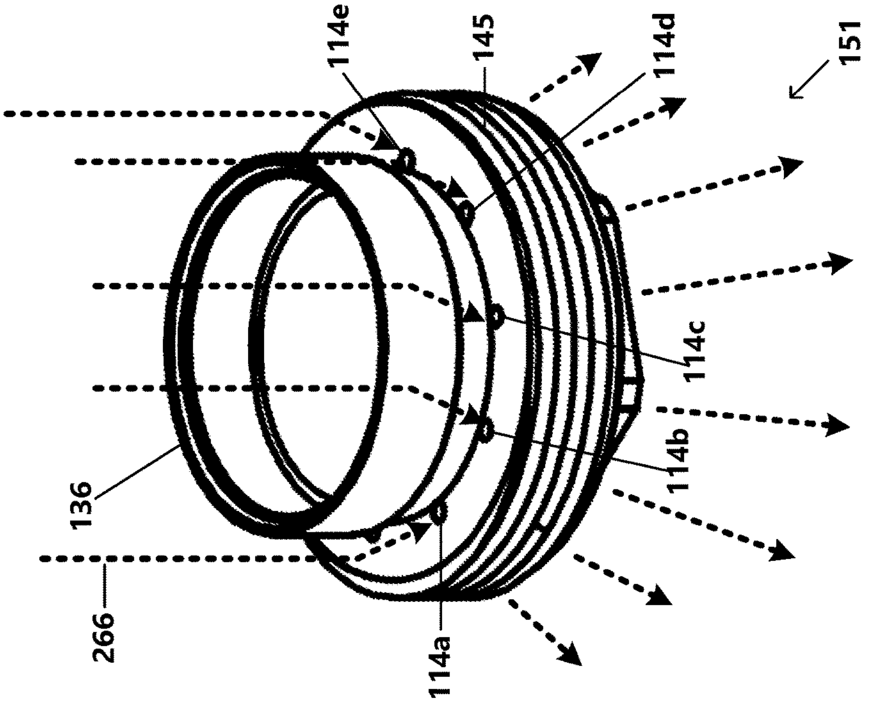
FIG. 24 illustrates a bottom perspective view of the spray head of FIG. 2 showing the spray outlet of FIG. 23.
Figure 23:
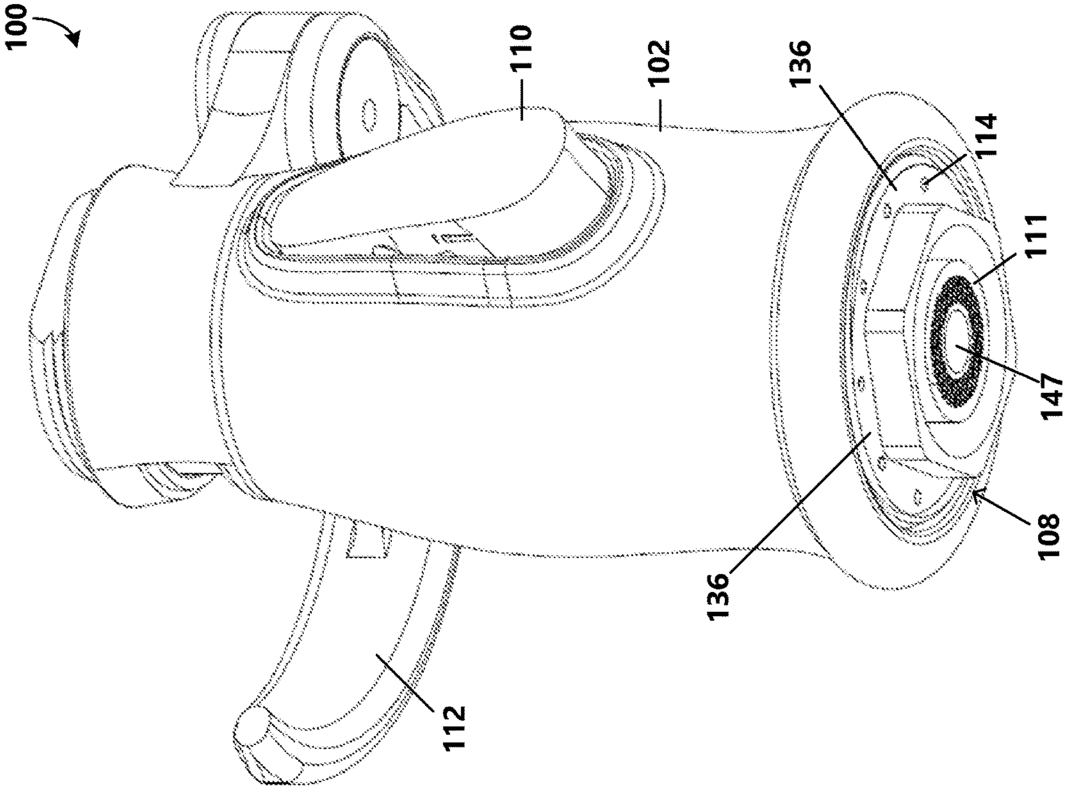
FIG. 23 illustrates a schematic representation of an example water flow and resulting shower spray output overlaid on a top perspective view of a spray outlet according to an embodiment of the present disclosure.

At operation 25, the flow of water may exit outward from the faucet 101 through the outlet 108 of the spray head 100 through a plurality of radially-spaced holes 114*a-n* (generally 114) (best shown in FIGS. 4, 23, and 24). Accordingly, the water may exit the spray head 100 in a spray pattern.

In response to the stream mode being selected at operation 15, at operation 30, the flow of water may be diverted along the aerated stream flow path within the spray head 100. For example, the aerated stream flow path may lead to an aerator subassembly 116 (shown in FIG. 16). The aerator subassembly 116 may be configured to break up the water flowing through the spray head into several small streams while introducing air into the water flow.

At operation 35, the flow of water may exit outward from the aerator subassembly 116 and through the outlet 108 of the spray head 100 as an aerated stream.

At operation 40, the stream modulation control 112 may be actuated by the user. For example, the user may operate the stream modulation control 112 by squeezing the stream modulation control 112 or via another actuation method. In some examples, an amount of force the user applies to the stream modulation control 112 and/or a position of the stream modulation control 112 responsive to a user-applied force may correspond to which flow path(s) within the spray head 100 are opened or closed.

At operation 45, a cone stream path may be opened. For example, the user may exert an amount of force to actuate the stream modulation control 112 to a position at which the aerated stream flow path may be at least partially closed and the opening the cone stream flow path may be at least partially opened.

At operation 50, the flow of water may be directed along the cone flow path within the spray head 100. For example, the cone stream flow path may lead to a swirl chamber 137 (best shown in FIG. 18), where the flow of water may be set into a swirling motion. The swirl chamber may be configured to set the flow of water into a swirling motion by having an inlet orifice that is located such that the flow of water enters the swirl chamber 137 tangentially, causing the water to swirl and produce a cone stream as it exits outward through the outlet 108 of the spray head 100.

At operation 55, the flow of water may exit the swirl chamber 137 and through the outlet 108 of the spray head 100 as a cone stream.

At operation 60, a straight beam stream path may be opened. For example, the user may exert an amount of force to actuate the stream modulation control 112 to a position at which the aerated stream flow path may be closed, the cone stream flow path may be at least partially closed, and the straight beam stream path may be at least partially opened.

At operation 65, the flow of water may be directed along the straight beam stream flow path within the spray head 100. For example, the straight beam stream flow path may lead to an inlet of a swirl nozzle 198 (shown in FIG. 18) that may be positioned such that the flow of water may enter the swirl nozzle 198 from above, causing the water to flow downward straight through the swirl chamber 137.

At operation 70, the flow of water may exit outward through the swirl nozzle 198 and through the outlet 108 of the spray head 100 as a solid straight beam stream of water. The user may use the stream modulation control 112 to dynamically adjust the water flow. For example, the user may exert more or less force on the stream modulation control 112 to modulate the output of the water between an aerated stream, a cone stream, and a concentrated straight beam stream. Water may continue to be expelled at a desired output pattern until the faucet 101 is turned off by the user at operation 10.

Figure 5:
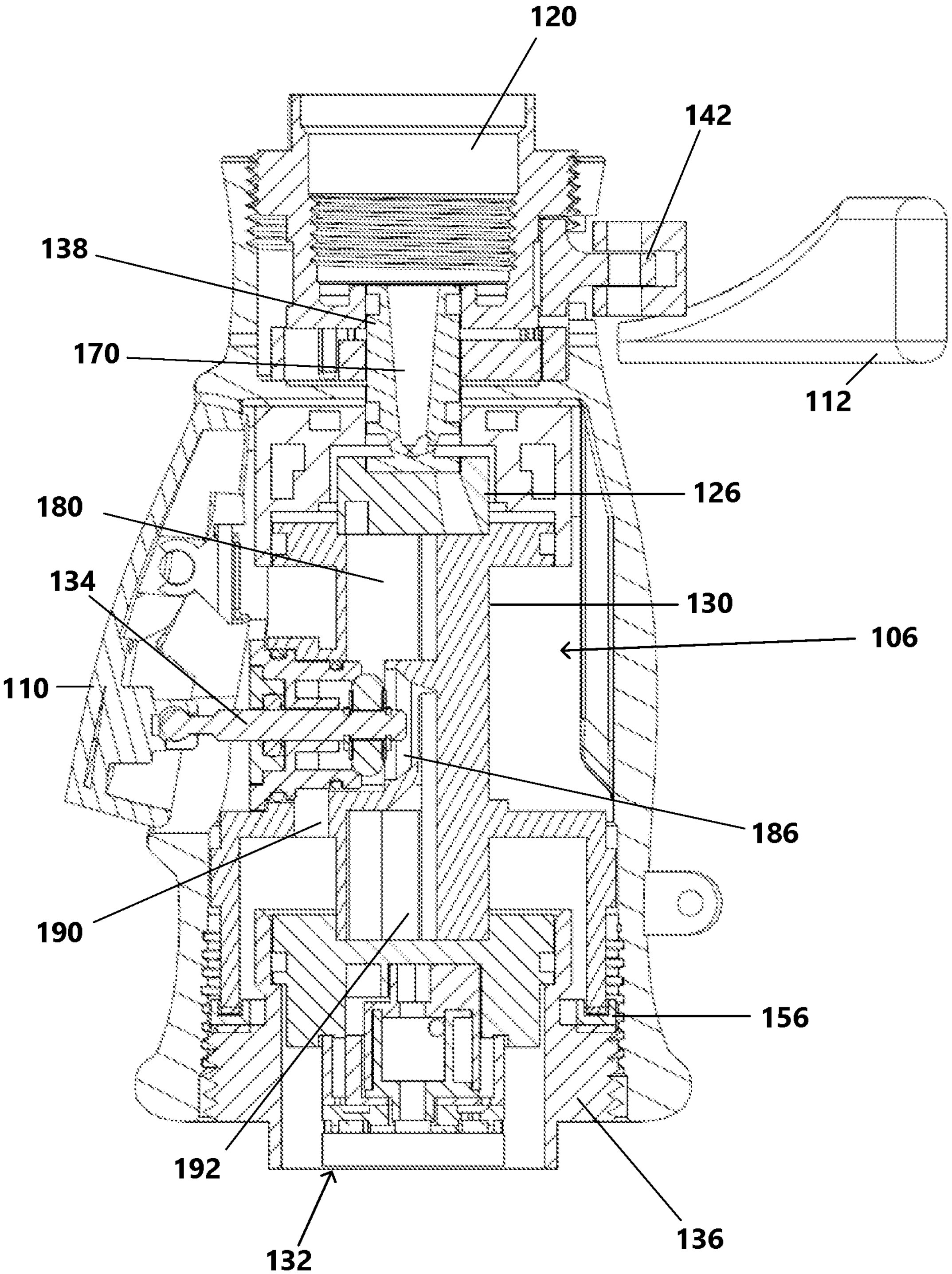
FIG. 5 illustrates a side cross-section view of the spray head of FIG. 2.

FIG. 4 is an exploded view of various components of the example embodiment of the spray head 100 illustrated in FIG. 2, and FIG. 5 is a cross-sectional view of the spray head 100 of FIGS. 2 and 4. With combined reference to FIGS. 4 and 5, the spray head 100 may include an upper conduit 120, which may be a tubular member with an upper internally threaded barrel for attachment to the faucet hose 105 of the faucet 101. The upper conduit 120 may additionally attach to the outer housing 102 of the spray head 100 via an external threading. The outer housing 102 may be a generally tubular downwardly-flared component defining the inlet 104 and the outlet 108 of the spray head 100 along a vertical axis 175. In some examples, the outer housing 102 may further define a first slot 122 through which the mode selection control 110 may be exposed. In some examples and as illustrated, the mode selection control 110 may be configured as a button, and the first slot 122 may be an axial slot for detent-seating and exposure of the button. According to an aspect, the mode selection control 110 may be in a normally unbiased position, which may correspond with the modulated stream mode. The user may actuate the mode selection control 110 (e.g., when the mode selection control 110 is implemented as a button, by pressing the button), which may place the mode selection control 110 in a biased position corresponding with the spray mode. According to an aspect, the mode selection control 110 may provide a convenient pressable button for selecting between a spray output and a modulated stream output.

In some examples, the stream modulation control 112 may be configured to rotatably drive a pathway control stem assembly 124 located in an internal section 106 of the spray head 100 enclosed within the outer housing 102. As will be described in further detail below, rotation of the pathway control stem assembly 124 may direct a flow of water between a plurality of flow paths for providing an adjustable stream pattern (e.g., between an aerated stream, a cone stream, and a straight beam stream). The stream modulation control 112 can vary in design, and the design of the pathway control stem assembly 124 can vary based on the design of the stream modulation control 112. Various example embodiments of a stream modulation control 112 and example embodiments of a pathway control stem assembly 124 are described below.

In some examples, water may enter the upper conduit 120 and flow through the pathway control stem assembly 124, where the flow of water may be directed along a water flow path (e.g., a spray flow path, an aerated stream flow path, cone stream flow path, or the straight beam stream flow path) based on user actuation of the mode selection control 110 and/or the stream modulation control 112. In the depicted example of FIG. 4, the spray head 100 includes a flow pathway disk 126. The flow pathway disk 126 may define a plurality of openings 128 (best shown in FIG. 11) that may align with one or more water flow paths, wherein each flow path may correspond with a particular water output pattern (e.g., a shower spray, an aerated stream, a cone stream, and a straight beam stream). In some examples and as will be described in further detail below, actuation of the stream modulation control 112 may cause one or more of the flow pathway disk (FPD) openings 128 to be covered or uncovered, thus directing the water flow along one or more water flow paths through the spray head 100.

In the depicted example of FIG. 4, the spray head 100 includes a central manifold 130, which is in fluid communication with the flow pathway disk 126 and therethrough which the plurality of water flow paths run. In some examples, and as shown in FIG. 5, a piston 134 is positioned inside the central manifold 130 and attached to the mode selection control 110. In some examples, the piston 134 may be in a normally unbiased position, which may correspond with the modulated stream mode. For example, when in the unbiased position, an end of the piston 134 may be positioned within a portion of the spray flow path, thus closing the spray flow path and opening the aerator flow path. Actuation of the mode selection control 110 may place the mode selection control 110 in a biased position, which may move the piston 134 into a biased position, closing the aerator flow path and opening the spray flow path.

In the depicted example of FIG. 4, the spray head 100 further includes a nozzle assembly 132. The nozzle assembly 132 is in fluid communication with the central manifold 130, and the plurality of water flow paths further run from the central manifold 130 through the nozzle assembly 132. In some examples, the spray head 100 includes a spray outlet 136 comprising an external thread that attaches to an internal thread on the central manifold 130. A cap seal 156 may be interposed between the central manifold 130 and the spray outlet 136 to prevent leaks from going through the first slot 122 defined in the outer housing 102 through which the mode selection control 110 is exposed.

Figure 6:
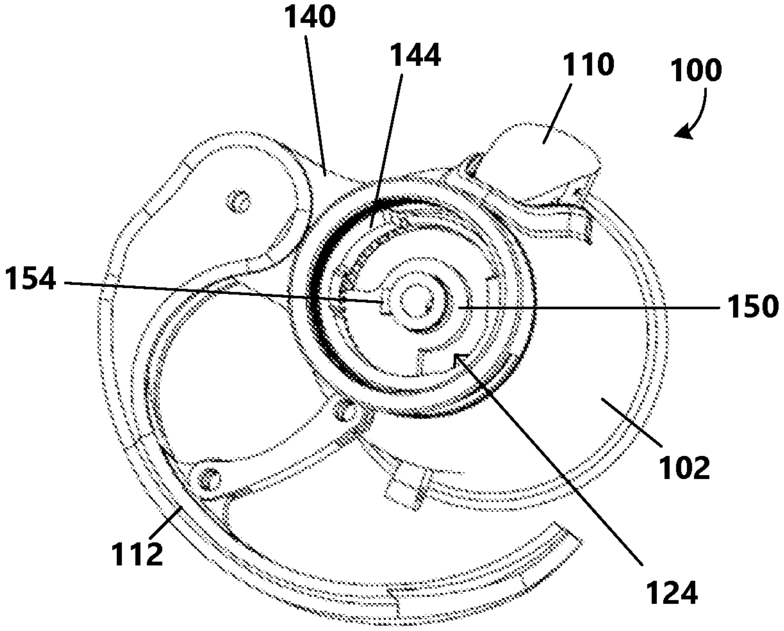
FIG. 6 illustrates a top perspective view of the example embodiment of the spray head of FIG. 2 including a stream modulation control according to an embodiment of the present disclosure.
Figure 7:
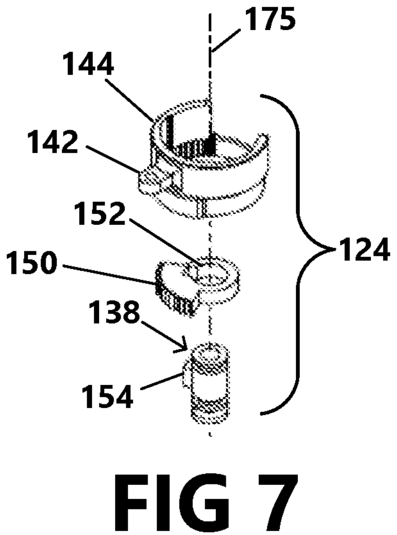
FIG. 7 illustrates a perspective exploded view of an example embodiment of the pathway control stem assembly configured for operation with the stream modulation control illustrated in FIG. 6.
Figure 8:
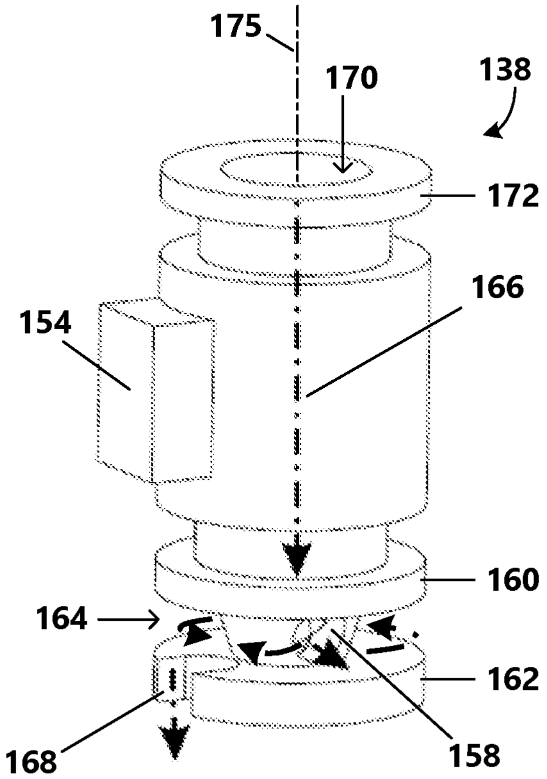
FIG. 8 illustrates a side perspective view of an example pathway control stem included in the pathway control stem assembly illustrated in FIG. 7 according to an embodiment of the present disclosure.

With reference now to FIGS. 6-8, FIG. 6 illustrates a top perspective view of the example embodiment of the spray head 100 of FIGS. 2, 4, and 5, wherein the depicted example includes a stream modulation control 112 according to one example embodiment of the present disclosure. FIG. 7 illustrates a perspective exploded view of an example embodiment of the pathway control stem assembly 124 configured for operation with the stream modulation control 112 illustrated in FIG. 6. FIG. 8 illustrates a side perspective view of a pathway control stem 138 included in the pathway control stem assembly 124 illustrated in FIG. 7. In some examples, user actuation of the stream modulation control 112 may drive rotation of the pathway control stem 138 for directing a flow of water between a plurality of flow paths for providing an adjustable stream pattern (e.g., between an aerated stream, a cone stream, and a straight beam stream). As mentioned previously, the stream modulation control 112 can vary in design. Accordingly, the pathway control stem assembly 124 and the pathway control stem 138 can also and correspondingly vary in design.

In some examples and as shown in FIG. 6, the stream modulation control 112 may be configured as a rotary lever assembly. When configured as a rotary lever assembly, the stream modulation control 112 may be pivotably attached at one end (e.g., via a pin 167 or other rotatable attachment means) to a tab 140 that extends from the outer housing 102. As shown in FIG. 7, the stream modulation control 112 may further be drivably attached to a slide switch 142 that extends radially from an annular collar 144 and that extends through a second slot 148 (shown in FIG. 4) formed in the outer housing 102 of the spray head 100 proximate the inlet 104. In some examples, when the stream modulation control 112 is configured as a rotary lever, the second slot 148 may be configured as a radial slot for passing the slide switch 142 of the annular collar 144 when the stream modulation control 112 is actuated (e.g., squeezed) or released by the user. According to an aspect, a spring 146 may normally maintain the stream modulation control 112 in an unbiased position, which may correspond with providing an aerated stream or a shower spray water flow output. When the stream modulation control 112 is actuated or depressed by the user with a force greater than the resistance of the spring 146, the stream modulation control 112 may drive rotation of the annular collar 144. As illustrated, the annular collar 144 may be formed with inwardly disposed gear teeth. The annular collar 144 may be configured to be rotatably seated inside the outer housing 102 with the slide switch 142 protruding outwardly through the second slot 148. For example, the slide switch 142 may be configured to receive a drivable rotational force by the stream modulation control 112 responsive to user actuation of the stream modulation control 112.

In some examples and as shown in FIGS. 6 and 7, the pathway control stem assembly 124 may include a ring gear 150 defining a keyed central aperture 152. The keyed central aperture 152 may be configured to align with and receive the pathway control stem 138 for attachment. In some examples, a portion of the pathway control stem 138 is formed with a projection or key 154 that corresponds with the keyed central aperture 152. The ring gear 150 may comprise outwardly disposed teeth that run around a portion (e.g., approximately 180 degrees) of the ring gear 150 that may be configured to engage the inwardly disposed gear teeth of the annular collar 144. According to an example, to actuate or rotate the pathway control stem 138, the user may squeeze the stream modulation control 112, which may drive rotation of the annular collar 144, driving rotation of the ring gear 150, which further drives rotation of the pathway control stem 138.

In some examples, the pathway control stem 138 may be a generally annular member with a central chamber 170, an integrally formed top disk 172, an integrally formed middle disk 160, and an integrally formed bottom disk 162. For example, a lower chamber 164 may be defined in the space between the middle disk 160 and the bottom disk 162. The pathway control stem 138 may further define a plurality of pathway control stem (PCS) outlets (generally, 158). In the depicted example of FIG. 8, the PCS outlets 158 may be defined in a portion of the pathway control stem 138 between the middle disk 160 and the bottom disk 162. As illustrated in FIG. 8, a flow of water (herein referred to as a water flow 166) is schematically shown flowing through the central chamber 170 and exiting through a PCS outlet 158 into the lower chamber 164, and further flowing through a notch 168 defined in the bottom disk 162.

According to an aspect, the notch 168 may be designed to align with the plurality of FPD openings 128 defined in the flow pathway disk 126, wherein each FPD opening 128 may correspond with a different stream pattern (e.g., an aerated stream, a cone stream, and a straight beam stream). In some examples, when the notch 168 is in alignment with an FPD opening 128, a bottom surface of the bottom disk 162 surrounding the notch 168 may cover the other flow pathways that are not in alignment with the notch 168. The bottom disk 162, being integrally formed with the pathway control stem 138, may rotate when the pathway control stem 138 is rotated. The FPD openings 128 in the flow pathway disk 126 may therefore be opened or closed by rotating the pathway control stem 138 via actuation of the stream modulation control 112, thus directing the water flow between a plurality of flow paths for providing an adjustable stream pattern.

Figure 9:
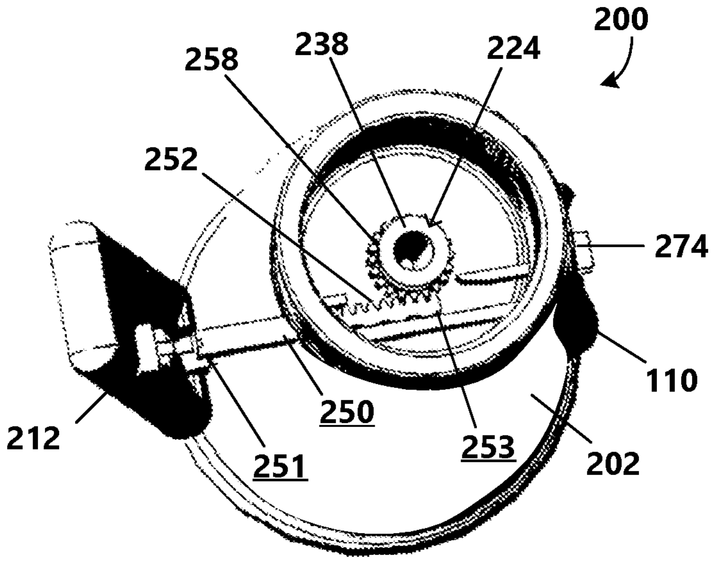
FIG. 9 illustrates a top perspective view of another example embodiment of the spray head including a stream modulation control according to another embodiment of the present disclosure.
Figure 10:
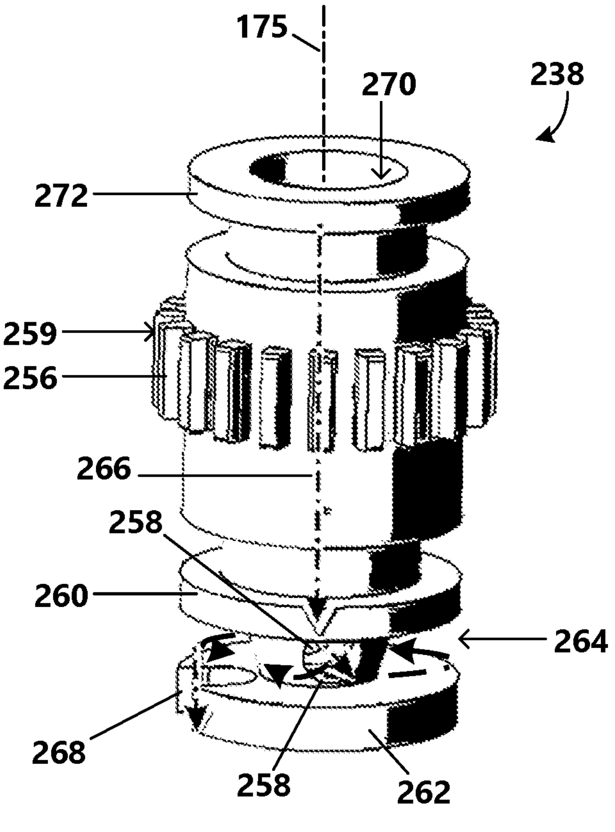
FIG. 10 illustrates a side perspective view of another example pathway control stem included in an example the pathway control stem assembly illustrated in FIG. 9 according to an embodiment of the present disclosure.

FIGS. 9 and 10 show another example of a stream modulation control 212, wherein the stream adjustment control 212 may be configured as a vertical lever or vertical trigger. FIG. 9 illustrates a top perspective view of an example embodiment of a spray head 200, wherein the depicted example includes the stream modulation control 212 configured as a vertical lever or vertical trigger according to one example embodiment of the present disclosure. Accordingly, another example of a pathway control stem assembly 224 is illustrated that may correspond with the design of the stream modulation control 212. In some examples, when the stream modulation control 212 is configured as a vertical lever as illustrated in FIG. 9, the pathway control stem assembly 224 may include a rack and pinion gear assembly. For example, the stream modulation control 212 may be drivably attached to a first end 251 of a rack 250 that extends from an opening in a spray head housing 202. A portion of the rack 250 intermediate the first end 251 and a second end 253 of the rack 250 may include a plurality of teeth 252 that are configured to engage and mate with a pinion gear 259 formed around a pathway control stem 238. Together, the rack 250 and the pinion gear 259 may comprise the rack and pinion gear assembly.

The rack 250 may be configured to drive rotation of the pathway control stem 238, wherein actuation of the stream modulation control 212 may drive movement of the rack 250 in a first or second direction, which may further drive rotation of the pathway control stem 238. In some examples, a spring (not shown) may normally maintain the rack 250 in an unbiased position, which may correspond with the aerated stream or shower spray. When the stream modulation control 212 is actuated or depressed by a user with a force greater than the resistance of the spring, the stream modulation control 212 may drive the rack 250 in the second direction. The pinion gear 259 may have a circular shape and may include a plurality of teeth 256 that extend around the periphery of the pinion gear 259. The pathway control stem 238 and pinion gear 259 may be rotatable about a common vertical axis 175. The teeth 256 of the pinion gear 259 may be configured to engage the teeth 252 on the rack 250. Thus, when the rack 250 is driven in the first or second direction, the rack 250 may drive rotation of the pathway control stem 238 in a clockwise or counterclockwise direction.

In some examples, the pathway control stem 238 may be a generally annular member with a central chamber 270, an integrally formed top disk 272, an integrally formed middle disk 260, and an integrally formed bottom disk 262. For example, a lower chamber 264 may be defined in the space between the middle disk 260 and the bottom disk 262. The pathway control stem 238 may further define a plurality of pathway control stem (PCS) outlets (generally, 258). In the depicted example of FIG. 10, the PCS outlets 258 may be defined in a portion of the pathway control stem 238 between the middle disk 260 and the bottom disk 262. As illustrated in FIG. 10, a flow of water 266 is schematically shown flowing through the central chamber 270 and exiting through PCS outlets 258 into the lower chamber 264, and further flowing through a notch 268 defined in the bottom disk 262.

According to an aspect, the notch 268 may be designed to align with the plurality of FPD openings 128 defined in the flow pathway disk 126 similarly to the first notch 268, described above, wherein each FPD opening 128 may correspond with a different stream pattern (e.g., an aerated stream, a cone stream, and a straight beam stream). In some examples, when the notch 268 is in alignment with an FPD opening 128, the bottom surface of the bottom disk 262 surrounding the notch 268 may cover the other flow pathways that are not in alignment with the notch 268. The bottom disk 262 is integrally formed with the pathway control stem 238, and thus may rotate when the pathway control stem 238 is rotated. The FPD openings 128 in the flow pathway disk 126 may therefore be opened or closed by rotating the pathway control stem 238 via actuation of the stream modulation control 212, thus directing the water flow between a plurality of flow paths for providing an adjustable stream pattern.

In some examples and as shown in FIG. 9, the spray head 200 may include a lock 274 that may be actuated by the user to lock the stream modulation control 212 and the pathway control stem 238 at a position for providing a consistent stream pattern. For example, actuation of the lock 274 may cause the lock 274 to engage a tooth 252 of the pinion gear 259 and thus preventing rotation of the pathway control stem 238.

Figure 11:
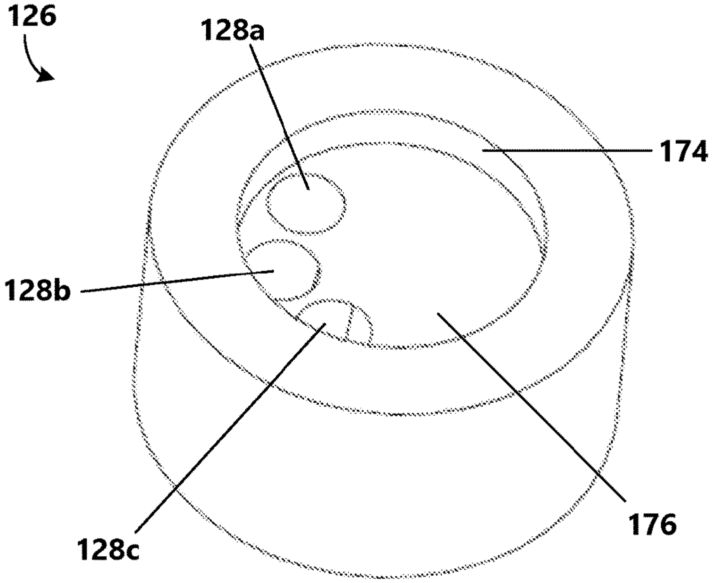
FIG. 11 illustrates a top perspective view of a flow pathway disk according to an example embodiment of the present disclosure.
Figure 12:
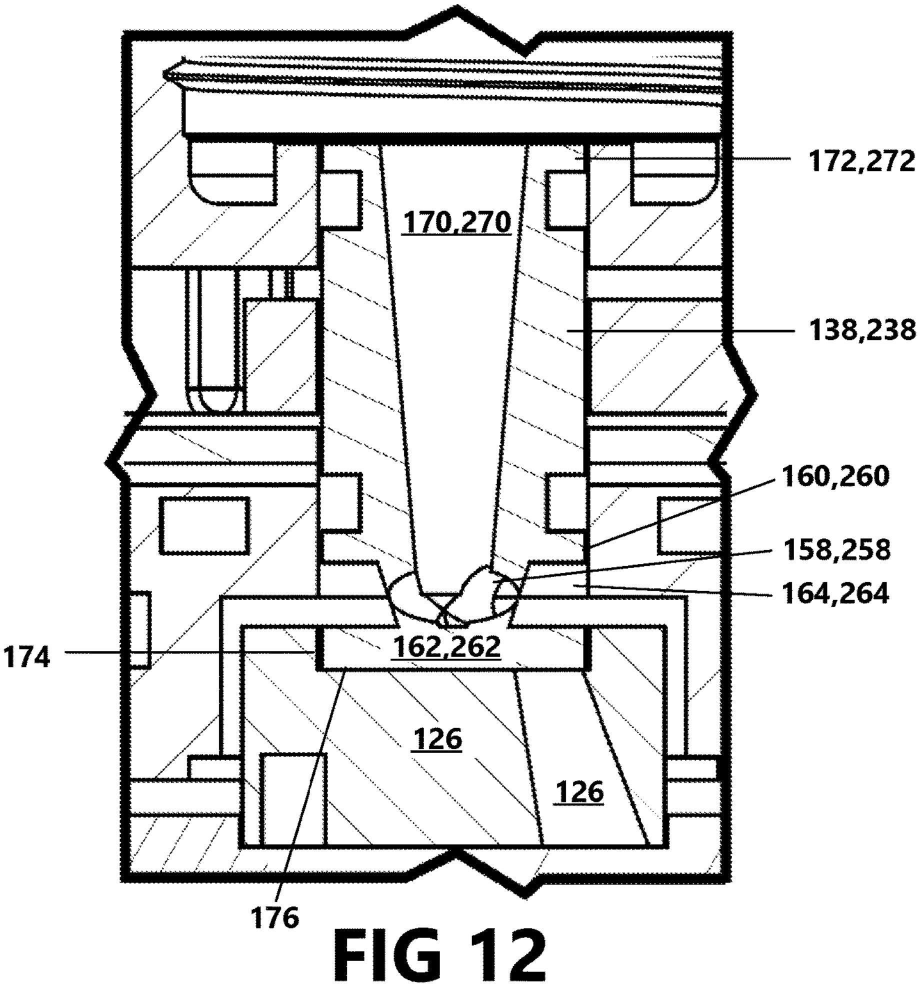
FIG. 12 illustrates a cutaway side cross-section view of the flow pathway disk illustrated in FIG. 11 and the pathway control stem illustrated in FIG. 8 or FIG. 10.

FIG. 11 shows a perspective illustration of the flow pathway disk 126 according to one example embodiment, and FIG. 12 shows a cutaway side cross-section view of the flow pathway disk illustrated in FIG. 11 and the pathway control stem illustrated in FIG. 8 or FIG. 10. As described above, the flow pathway disk 126 may define a plurality of FPD openings 128*a*, 128*b*, 128*c* that may each align with a water flow path corresponding with a particular water output pattern (e.g., a shower spray, an aerated stream, a cone stream, and a straight beam stream). In some examples, the flow pathway disk 126 may have a raised exterior sidewall 174, forming a recess 176 within which the bottom disk 162, 262 of the pathway control stem 138, 238 may be seated. The flow pathway disk 126 illustrated in FIG. 11 comprises three FPD openings 128*a*, 128*b*, 128*c*: a first FPD opening 128*a* defining a starting point of an aerated stream flow path and a spray flow path, a second FPD opening 128*b* defining a starting point of a cone stream flow path, and a third FPD opening 128*c* defining a starting point of a straight beam stream flow path. Each FPD opening 128 may be aligned with a different port inlet included in the central manifold 130.

Figure 13:
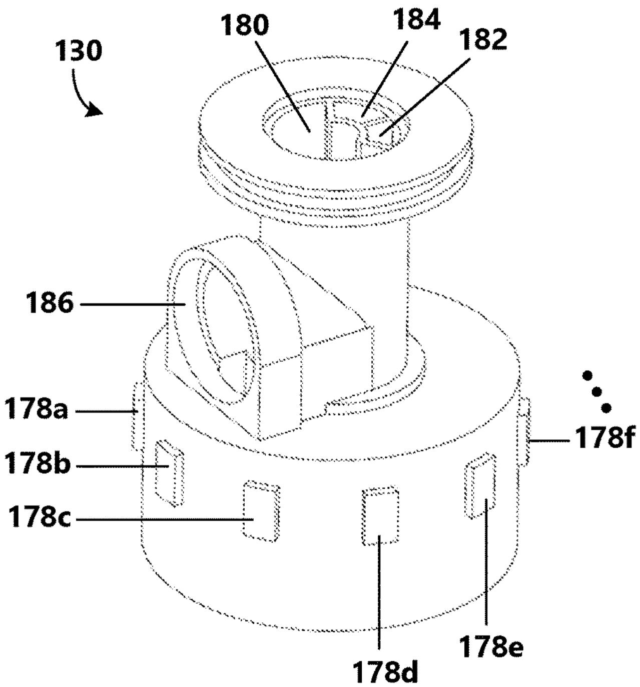
FIG. 13 illustrates a top perspective view of a central manifold for operation in a spray head with the flow pathway disk illustrated in FIG. 12 according to an example embodiment of the present disclosure.
Figure 14:
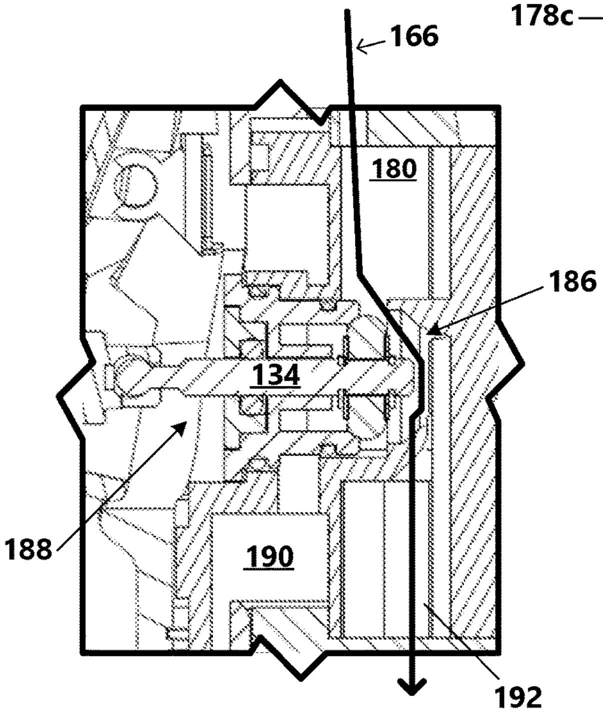
FIG. 14 illustrates a cutaway side cross-section view of the central manifold of FIG. 13 and shows a water flow being directed along an aerated stream flow path according to an example embodiment of the present disclosure.
Figure 15:
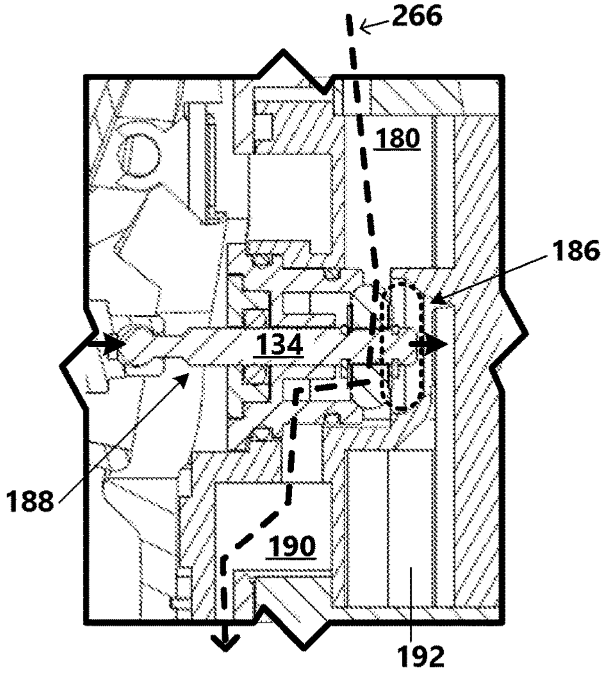
FIG. 15 illustrates another cutaway side cross-section view of the central manifold of FIG. 13 and shows a water flow being directed along a spray flow path according to an example embodiment of the present disclosure.

FIG. 13 illustrates a top perspective view of a central manifold 130 for operation in a spray head 100, 200 with the flow pathway disk 126 illustrated in FIG. 11 in accordance with one embodiment of the present disclosure, and FIGS. 14 and 15 illustrate a cutaway side cross-section view of the central manifold 130 of FIG. 13. In some examples, the central manifold 130 may be a complex and generally tubular member enclosed within the outer housing 102 of the spray head 100, 200. In some examples, the central manifold 130 may have an upper externally threaded barrel for attachment to the upper conduit 120. The central manifold 130 may be formed with a plurality of projections 178*a-n* (generally 178) that protrude around a lower tubular portion of the central manifold 130. The projections 178 may be configured to engage corresponding receiving recesses (not shown) defined internally in the outer housing 102 to prevent rotation of the central manifold 130 with respect to the outer housing 102.

The central manifold 130 may comprise a plurality of ports 180, 182, 184 that may be defined therethrough: a combined shower spray and aerated stream port 180, a central manifold (CM) cone stream port 182, and a CM straight beam stream port 184. Each FPD opening 128 may be aligned with a different port inlet included in the central manifold 130. In some examples, the first FPD opening 128*a* may be configured to align with an inlet of the spray and aerated stream port 180. Accordingly, the aerated stream flow path and a spray flow path may continue through the shower spray and aerated stream port 180. In some examples, the second FPD opening 128*b* may be configured to align with an inlet of the CM cone stream port 182. Accordingly, the cone stream flow path may continue through the CM cone stream port 182. In some examples, the third FPD opening 128*c* may be configured to align with an inlet of the CM straight beam stream port 184. Accordingly, the straight beam stream flow path may continue through the CM straight beam stream port 184.

In some examples, the central manifold 130 may comprise a diverter chamber 186 configured to enter sidelong into the shower spray and aerated stream port 180. In some examples, a diverter piston assembly 188 may be positioned in the diverter chamber 186. In some examples, the diverter piston assembly 188 may include a piston 134 that is configured to be inserted into the diverter chamber 186. The diverter piston assembly 188 may be controlled (e.g., the piston 134 may be urged in and out of the diverter chamber 186) by operation of the mode selection control 110. In some examples, a first end of the piston 134 may be configured to drivably receive an actuation input of the mode selection control 110, wherein the actuation input may drive the piston 134 from an unbiased position to a biased position and allow the user to make the selection of a spray output from a modulated stream output. For example, a second end of the piston 134 may be configured to open or close an aerated stream port 192 and a shower spray port 190 included in the central manifold 130, based on user-actuation of the mode selection control 110. In some examples, when the mode selection control 110 is not actuated, the piston 134 may be in an unbiased position, which may close the shower spray port 190 and open the aerated stream port 192 for directing a flow of water along an aerated stream path. In some examples, when the mode selection control 110 is actuated, the piston 134 may be in a biased position, which may open the shower spray port 190 and close the aerated stream port 192 for directing a flow of water along a shower spray path.

A first water flow 166 is schematically illustrated in FIG. 14 as a solid line. In some examples, the first water flow 166 may enter the central manifold 130 through the shower spray and aerated stream port 180. If an aerated stream output of water is desired by the user, the user may not actuate the mode selection control 110. Thus, the piston 134 may remain in an unbiased position, as illustrated in FIG. 14, directing the first water flow 166 further along an aerated stream flow path, which may include directing the first water flow 166 through the aerated stream port 192 as it exits the central manifold 130.

A second water flow 266 is schematically illustrated in FIG. 15 as a dashed line. In some examples, the second water flow 266 may enter the central manifold 130 through the shower spray and aerated stream port 180. If a spray output is desired by the user, the user may depress the mode selection control 110, which may bear against the piston 134, causing the piston 134 to be urged further into the diverter chamber 186 and into a biased position. The biased position of the second end of the piston 134 is represented in FIG. 15 as a dotted line. In the biased position, the second end of the piston 134 may close the aerated stream port 192 and uncover/open the shower spray port 190. Accordingly, the second water flow 266 is shown redirected along a spray flow path, which may include diverting the second water flow 266 through the shower spray port 190 as it exits the central manifold 130.

Figure 18:
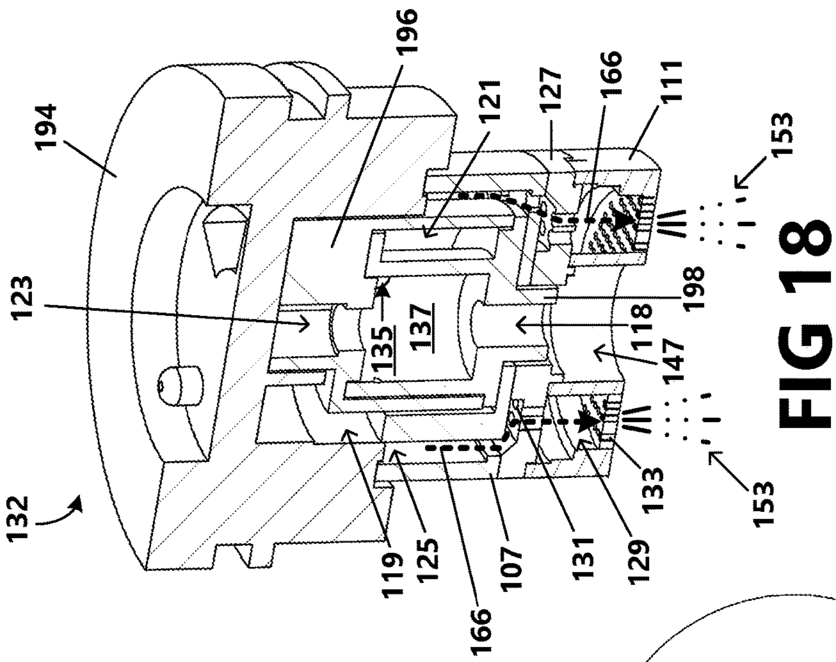
FIG. 18 illustrates a top perspective cross-section view of the nozzle assembly of FIG. 16.
Figure 17:
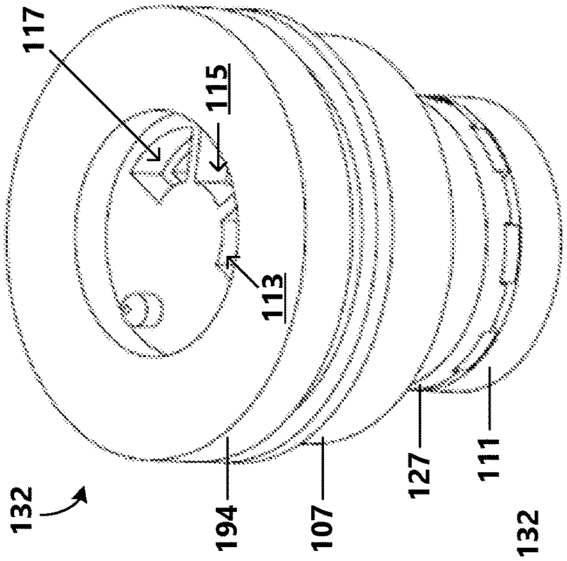
FIG. 17 illustrates a top perspective view of the nozzle assembly of FIG. 16.
Figure 19:
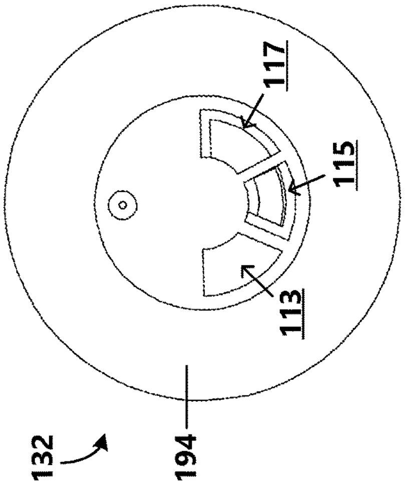
FIG. 19 illustrates a top view of a stream puck of the nozzle assembly of FIG. 16 according to an example embodiment of the present disclosure.
Figure 16:
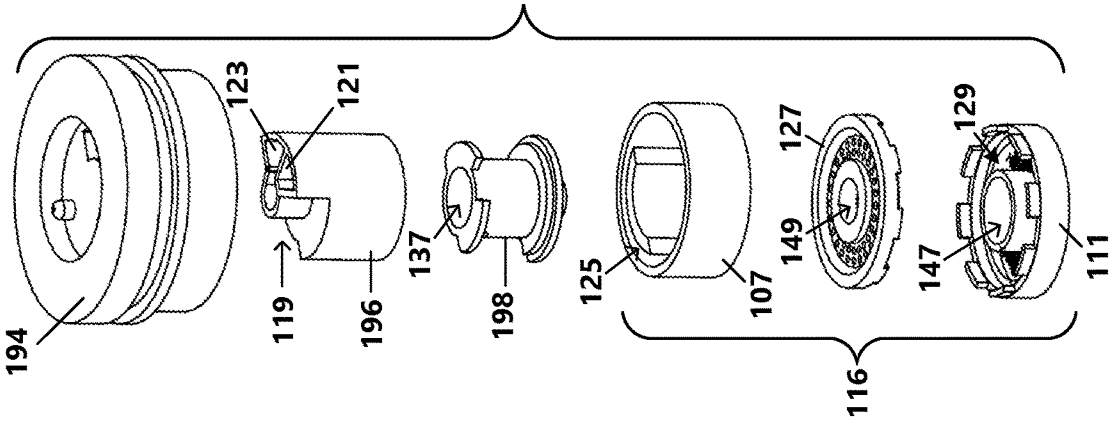
FIG. 16 illustrates an exploded view of a nozzle assembly according to an example embodiment of the present disclosure.

FIG. 16 is an exploded view of an example nozzle assembly 132 according to an embodiment of the present disclosure. FIG. 17 is a perspective view, FIG. 18 is a perspective cross-section, and FIG. 19 is a top view of the example nozzle assembly 132. As shown, the nozzle assembly 132 may be comprised of a stream puck 194, a flow puck 196, a swirl nozzle 198, and an aerator subassembly 116. The nozzle assembly 132 may be configured to provide a double output path through the outlet 108 of the outer housing 102: a first output path through the aerator subassembly 116 (for an aerated stream, as will be described in further detail below) and a second output path through the flow puck 196 (for a cone stream and a straight beam stream).

In some examples, the aerator subassembly 116 may include a nozzle housing 107, an aerator top disk 127, and an aerator bottom disk 111. The stream puck 194 may be a generally tubular member configured for attachment to the central manifold 130. As depicted in FIG. 17 and FIG. 19, the stream puck 194 may comprise a plurality of stream puck (SP) ports 113, 115, 117 that may be defined therethrough: an SP aerated stream port 113, an SP cone stream port 115, and a straight beam stream port 117.

In some examples, the aerated stream port 192 defined in the central manifold 130 may be configured to align with an inlet of the aerated stream port 113 defined in the stream puck 194. Accordingly, a water flow 166 directed along the aerated stream flow path may be further directed to flow from the aerated stream port 192 and into the SP aerated stream port 113.

In some examples, the CM cone stream port 182 defined in the central manifold 130 may be configured to align with an inlet of the SP cone stream port 115 defined in the stream puck 194. Accordingly, the CM cone stream flow path may further continue from the CM cone stream port 182 to the SP cone stream port 115.

In some examples, the CM straight beam stream port 184 defined in the central manifold 130 may be configured to align with an inlet of the straight beam stream port 117 defined in the stream puck 194. Accordingly, the straight beam stream flow path may further continue from the CM straight beam stream port 184 to the straight beam stream port 117.

In some examples, the flow puck 196 may be positioned between the stream puck 194 and the nozzle housing 107. The flow puck 196 may include a plurality of ports 121, 123 defined therethrough. In some examples, the flow puck 196 may include a swirl nozzle port 121, wherein an inlet of the swirl nozzle port 121 may be configured to align with the SP cone stream port 115 defined in the stream puck 194. In some examples, the flow puck 196 may further include a beam formation port 123, wherein an inlet of the beam formation port 123 may be configured to align with the straight beam stream port 117 defined in the stream puck 194.

As shown, the flow puck 196 may have a generally cylindrical outer profile shape and the stream puck 194 has a complementary generally cylindrical inner profile shape within which the outer profile of the flow puck 196 can be received. In some examples, the swirl nozzle 198 is configured to be positioned between the flow puck 196 and the nozzle housing 107. In some examples, the swirl nozzle port 121 and the beam formation port 123 may extend higher than the other portion of the outer profile of the flow puck 196. When the flow puck 196 is received within the stream puck 194, the inner profile of the stream puck 194 may define a portion of an outer profile of an aerator channel 119. In some examples, the aerator channel 119 may be configured to align with an aerator port 125 defined in the nozzle housing 107. For example, a water flow 166 directed along the aerated stream flow path may be further directed to flow from the SP aerated stream port 113 in the stream puck 194 into the aerator channel 119, and further into the nozzle housing (NH) aerator port 125.

In some examples, the aerator top disk 127 is configured to be positioned between the nozzle housing 107 and the aerator bottom disk 111, and the NH aerator port 125 may be configured to align with an aerator chamber 129 defined between a raised inner and outer profile of the aerator bottom disk 111. A plurality of top aerator holes 131 may be defined in the aerator top disk 127. A water flow 166 directed along the aerated stream flow path may exit the NH aerator port 125 through the plurality the top aerator holes 131 defined in the aerator top disk 127 and into the aerator chamber 129.

The top aerator holes 131 may be designed to break up the water flowing through the faucet into several small streams while introducing air into the water flow 166.

In some examples, a plurality of bottom aerator holes 133 may be defined in the aerator bottom disk 111. The water flow 166 may exit the aerator chamber 129 through the plurality of bottom aerator holes 133 defined in the aerator bottom disk 111 and outward through the outlet 108 of the spray head outer housing 102 as an aerated stream 153. The bottom aerator holes 133 may further break up the water flowing through the faucet into several small streams while introducing additional air into the water flow 166. In some examples, the bottom aerator holes 133 may be smaller in diameter than the top aerator holes 131, which can help to provide a reduction of water volume with a feel of a higher-pressure flow.

Figure 20:
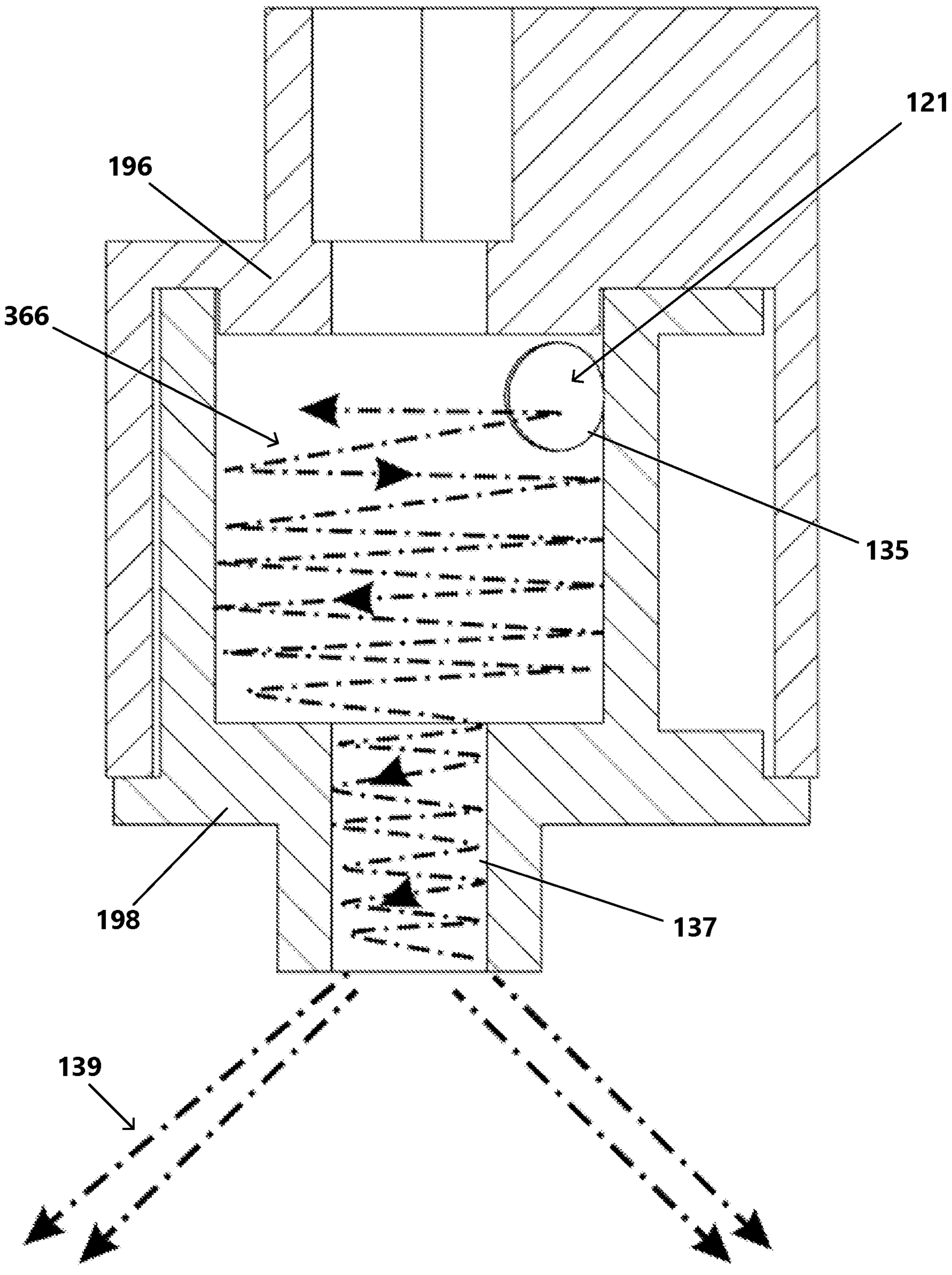
FIG. 20 illustrates a schematic representation of an example water flow and resulting cone stream water output overlaid on a side cross-section view of the flow puck and swirl nozzle of the nozzle assembly of FIG. 16 according to an embodiment of the present disclosure.

As best shown in a side cross-section view of the flow puck 196 and the swirl nozzle 198 illustrated in FIG. 20, in some examples, a side inlet 135 may be defined in an outer profile of the swirl nozzle 198. The side inlet 135 may be configured to align with the swirl nozzle port 121 defined in the flow puck 196. An inner profile of the swirl nozzle 198 may be generally cylindrical. When a flow of water (water flow 366) is directed along the cone stream flow path, the water flow 366 may be directed to flow through the SP cone stream port 115 in the stream puck 194, and then directed to flow tangentially through the swirl nozzle port 121 into the swirl nozzle 198. According to an aspect, tangential entry of the water flow 366 into swirl nozzle 198 may cause the water flow 366 to swirl within the swirl chamber 137 defined in the swirl nozzle 198. As the water flow 366 exits a nozzle 118 of the swirl nozzle 198, the swirling motion of the water may produce a cone stream 139 as depicted in FIG. 20. For example, the water flow 366 may be directed to exit the nozzle 118, further through an opening 149 defined within the aerator top disk 127 and an opening 147 defined in the aerator bottom disk 111, and through the outlet 108 of the spray head outer housing 102 for generating the cone stream 139. In some examples, an inner diameter of the opening 147 defined in the aerator bottom disk 111 may be greater in diameter than an inner diameter of the nozzle 118.

Figure 21:
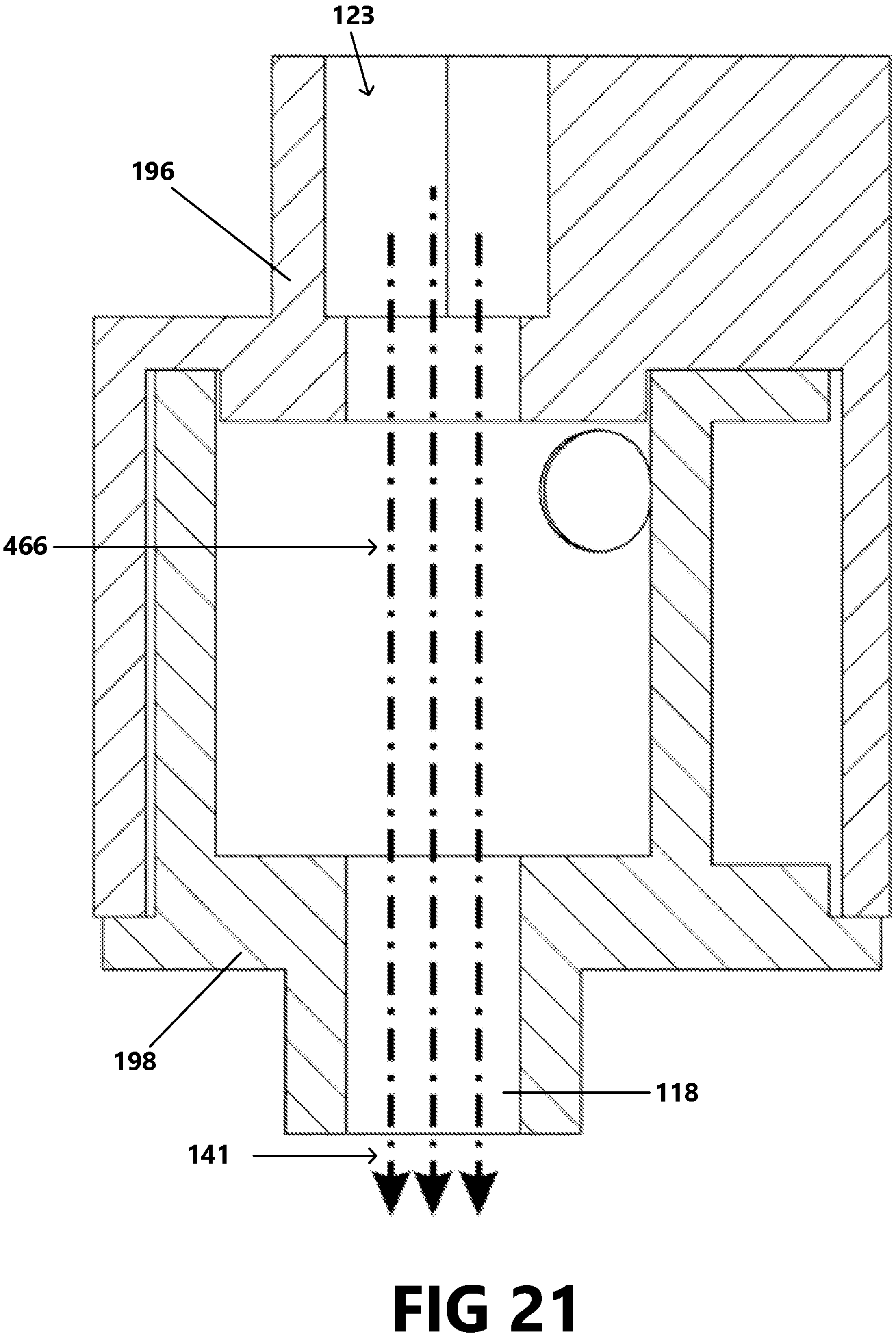
FIG. 21 illustrates a schematic representation of an example water flow and resulting straight beam stream water output overlaid on a side cross-section view of the flow puck and swirl nozzle of the nozzle assembly of FIG. 16 according to an embodiment of the present disclosure.

As described above, the straight beam stream port 117 defined in the stream puck 194 may be configured to align with the beam formation port 123 defined in the flow puck 196, which may be configured to align with a top inlet of the swirl nozzle 198. As best shown in another side cross-section view of the flow puck 196 and the swirl nozzle 198 illustrated in FIG. 21, when a flow of water (water flow 466) is directed along the straight beam stream flow path, the water flow 466 may be directed to flow from the beam formation port 123 straight downward through the top inlet of the swirl nozzle 198, where the water flow 466 may flow straight through the swirl chamber 137, exit the nozzle 118 of the swirl nozzle 198 and further through the outlet 108 of the spray head outer housing 102, producing a straight beam stream 141.

Figure 22:
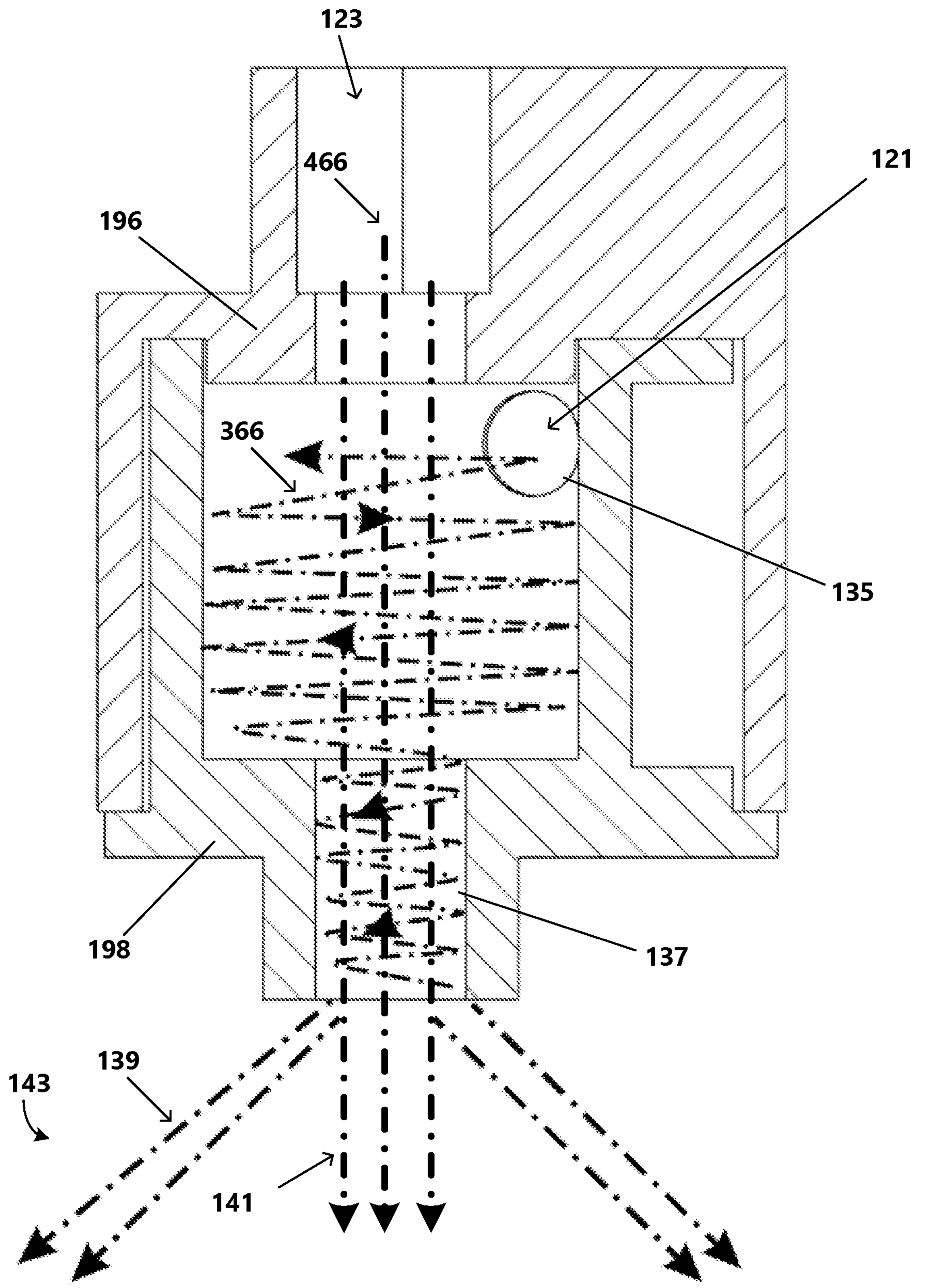
FIG. 22 illustrates a schematic representation of an example water flow and resulting mixed stream water output overlaid on a side cross-section view of the flow puck and swirl nozzle of the nozzle assembly of FIG. 16 according to an embodiment of the present disclosure.

In some cases, a mixed stream output may be desired or may be provided as a water flow is modulated between an aerated stream 153, a cone stream 139, and/or a straight beam stream 141. For example, the user may actuate the stream modulation control 112 with an amount of force and/or to a position where the notch 168 defined in the pathway control stem 138 may be in alignment with portions of two FPD openings: the first FPD opening **128*a* corresponding with an aerated stream and the second FPD opening 128*b* corresponding with a cone stream; or the second FPD opening 128*b* and the third FPD opening 128*c* corresponding with a straight beam stream. Accordingly, and as best illustrated in FIG. 22, when a water flow exits the pathway control stem 138 and enters both the second FPD opening 128*b* and the third FPD opening 128*c*, the water flow may be split into two water flows 366, 466. One water flow 366 may follow the cone stream path and exit the spray head 100, 200 as a cone stream 139, and the other water flow 466 may follow the straight beam stream path and exit the spray head 100, 200 as a straight beam stream 141. Thus, a mixed stream 143 output may be provided. In other examples, when the pathway control stem 138 is in alignment with the first FPD opening 128*a* and the second FPD opening 128*b*, a mixed stream output including an aerated stream 153 and a cone stream 139** may be provided.

FIG. 23 is a bottom perspective view of the example spray head 100 shown in FIG. 4 showing a bottom perspective view of the spray outlet 136 for providing a shower spray output according to an embodiment. FIG. 24 shows a top perspective view of the spray outlet 136. As described above, the spray outlet 136 may comprise an external thread 145 that attaches to an internal thread on the central manifold 130. When the spray outlet 136 is attached to the central manifold 130, a chamber may be provided between an upper external profile of the spray outlet 136 and the internal profile of the central manifold 130. When a shower spray output is desired by the user and the user actuates the mode selection control 110 to select the shower spray mode, the water flow 266 may be diverted through the shower spray port 190 of the central manifold 130, into the chamber provided between the spray outlet 136 and the central manifold 130, and may exit through the plurality of radially-spaced holes 114 in the spray outlet 136, producing a shower spray 151 as the water flow 266 exits the spray head 100.

Figure 25:
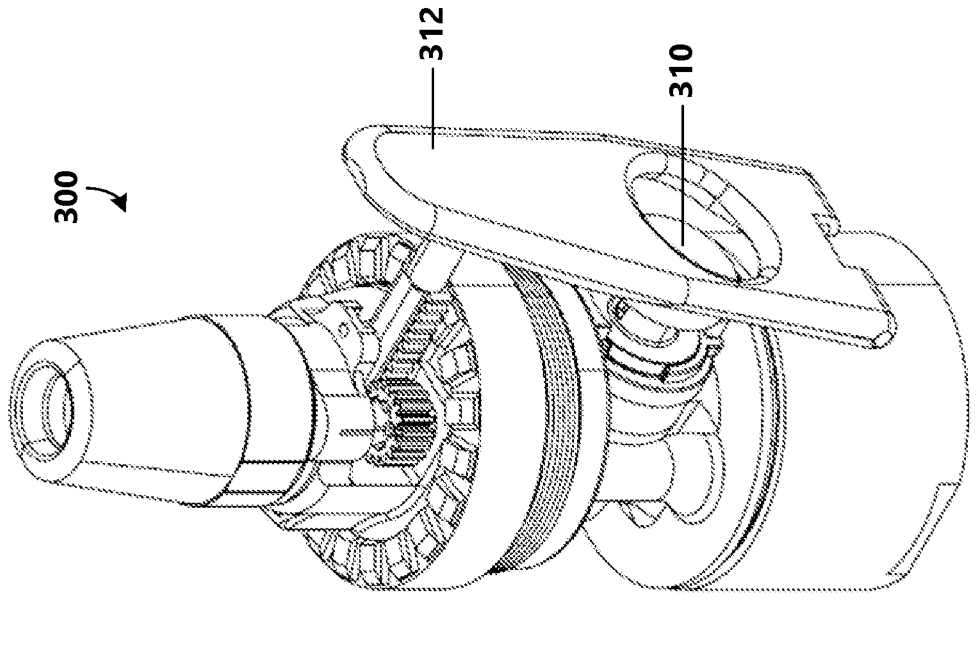
FIG. 25 illustrates a top perspective view of a spray head according to another embodiment of the present disclosure.
Figure 26:
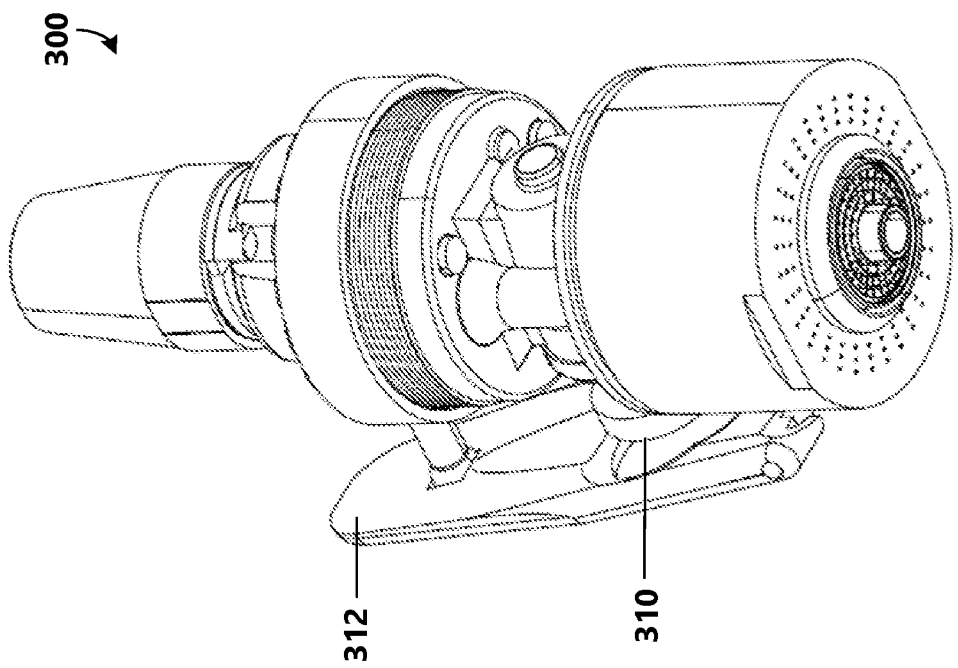
FIG. 26 illustrates a bottom perspective view of the spray head of FIG. 25.

FIGS. 25-54 illustrate various views of another example embodiment of a spray head 300. FIG. 25 is a top perspective view and FIG. 26 is a bottom perspective view of the example spray head 300. The spray head 300 may operate similarly to the previously described embodiments of the spray head 100, 200. The example spray head 300 depicted in FIGS. 25 and 26 is shown without the outer housing 102, such that various interior parts of the of the spray head 300 are visible. The illustrated embodiment of a stream modulation control 312 is shown implemented as a lever mechanism. As depicted, in some examples, the stream modulation control 312 may define an opening through which a mode selection control 310 may be exposed. For example, the mode selection control 310 may be configured as a button that can be actuated or depressed by the user, through the opening in the stream modulation control 312. As with the previous embodiments, an actuation force received by the mode selection control 310 may drive operation of the spray head 300 to divert a water flow 166, 266, 366, 466 along a spray path, and an actuation force received by the stream modulation control 312 may drive operation of the spray head 300 to modulate the output of the water (when in the modulated stream mode) between an aerated stream 153, a cone stream 139, and a concentrated straight beam stream 141.

Figure 27:
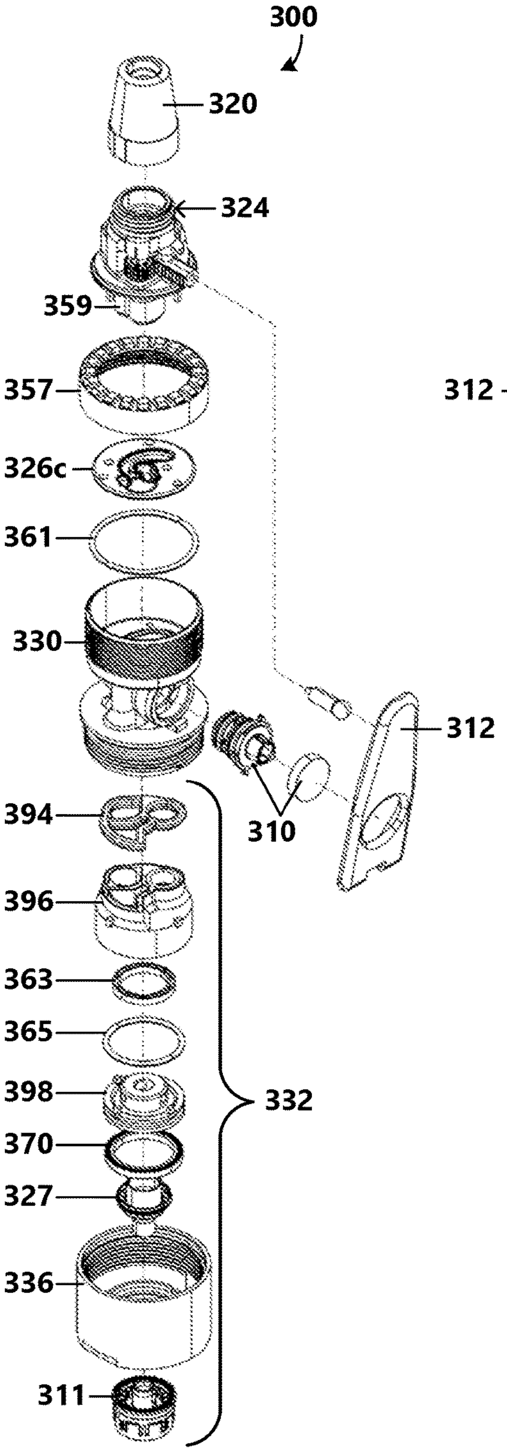
FIG. 27 illustrates an exploded top perspective view of the spray head of FIG. 25.
Figure 28:
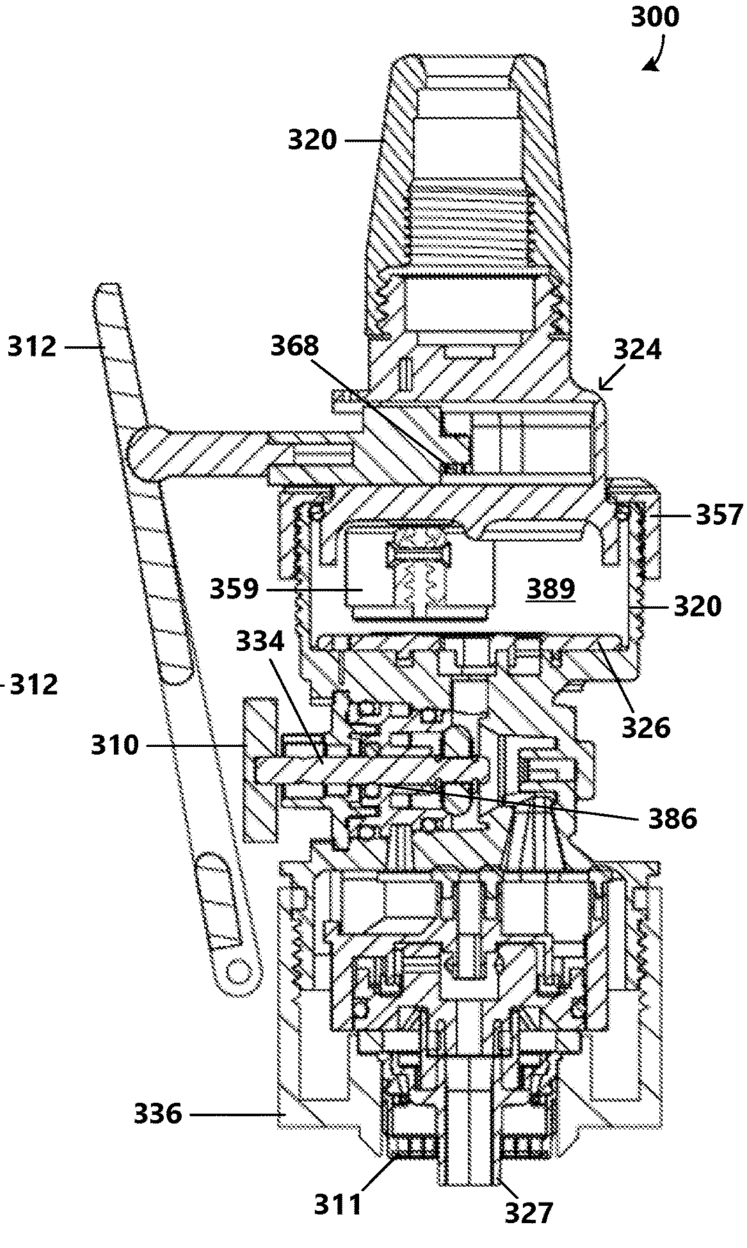
FIG. 28 illustrates a side cross-section view of the spray head of FIG. 25.

FIG. 27 is an exploded view of various components of the example embodiment of the spray head 300 illustrated in FIGS. 25 and 26, and FIG. 28 is a cross-sectional view of the spray head 300 of FIGS. 25, 26 and 27. With combined reference to FIGS. 27 and 28, the spray head 300 may include an upper conduit 320, which may be a tubular member with an upper internally threaded barrel for attachment to the faucet hose 105 of the faucet 101. The upper conduit 320 may further comprise a lower internally threaded barrel for attachment to a pathway control stem assembly 324. The pathway control stem assembly 324 may be in contact with the stream modulation control 312, which may drive rotation of a pathway control stem 338 and a pathway control seal 359 (included in the pathway control stem assembly 324) around a vertical axis 175.

In the depicted example of FIG. 27, a bottom flow pathway disk 326*c* of a flow pathway disk assembly 326 is shown. The flow pathway disk assembly 326 (best shown in FIGS. 35, 36, and 37, may be comprised of a top flow pathway disk 326*a*, a middle flow pathway disk 326*b*, and a bottom flow pathway disk 326*c*, and may define a plurality of openings 328 that may align with a plurality of water flow paths. Rotation of the pathway control stem 338 and the pathway control seal 359 around the vertical axis 175 may open or close one or more water flow paths within the spray head 300, wherein each flow path may correspond with a particular water output pattern (e.g., a shower spray 151, an aerated stream 153, a cone stream 139, and a straight beam stream 141). In some examples, an internally threaded attachment ring 357 may be configured to secure the pathway control stem assembly 324 to a central manifold 330. A seal 361 may be interposed between the attachment ring 357 and the central manifold 330.

Similar to the above-described embodiment of the central manifold 130, the central manifold 330 of the currently described embodiment may include a plurality of ports through which water may flow along one or more of a plurality of water flow paths. Further, and as shown in FIG. 28, a piston 334 may be positioned inside a diverter chamber 386 defined in the central manifold 330 and attached to the mode selection control 310. In some examples, the piston 334 may be in a normally unbiased position, which may correspond with the modulated stream mode. For example, when in the unbiased position, an end of the piston 334 may be positioned such that it closes the spray flow path and opens the aerator stream flow path. Actuation of the mode selection control 310 may place the mode selection control 310 in a biased position, which may move the piston 334 into a biased position, closing the aerator flow path and opening the spray flow path.

In the depicted example of FIG. 27, the spray head 300 further includes a nozzle assembly 332. The nozzle assembly 332 may be in fluid communication with the central manifold 330, and the plurality of water flow paths may further run from the central manifold 330 through the nozzle assembly 332 to exit the spray head 300 as a shower spray 151, an aerated stream 153, a cone stream 139, or a straight beam stream 141. As shown, the nozzle assembly 332 may be comprised of a flow puck seal 394, a flow puck 396, a swirl nozzle 398, an aerator top disk 327, a spray outlet 336, and an aerator bottom disk 311. The nozzle assembly 332 may be configured to provide a double output path through the outlet of the outer housing of the spray head 300: a first output path through an aerator subassembly 316 comprised of the aerator top disk 327 and the aerator bottom disk 311 (for an aerated stream 153, a cone stream 139, or a straight beam stream 141) and a second output path through the spray outlet 336 (for a shower spray 151). In some examples, various seals may be included to prevent leaks (e.g., a first seal 363 may be interposed between the flow puck 396 and the swirl nozzle 398, a second seal 365 may be positioned in a groove formed around a sidewall of the outer profile of the swirl nozzle 398, and a third seal 370 may be interposed between the swirl nozzle 398 and the aerator top disk 327).

Figure 29:
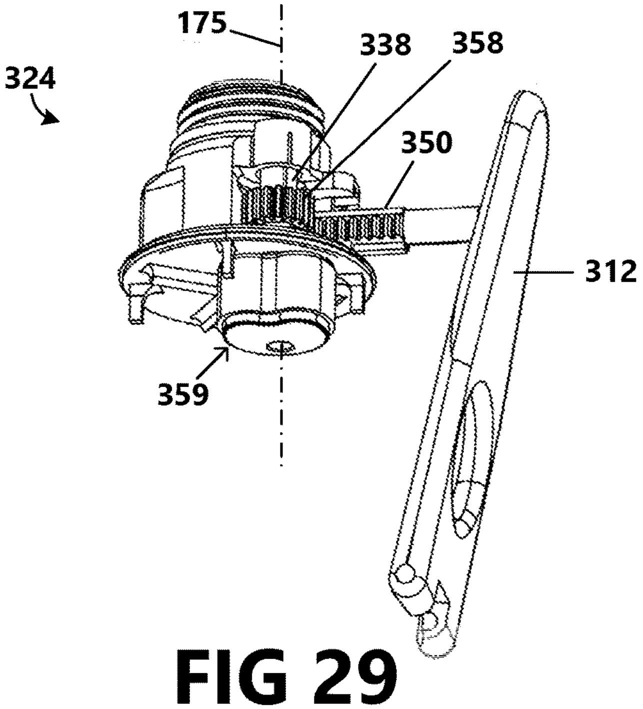
FIG. 29 illustrates a bottom perspective view of an example pathway control stem assembly and a stream modulation control according to an embodiment of the present disclosure.
Figure 30:
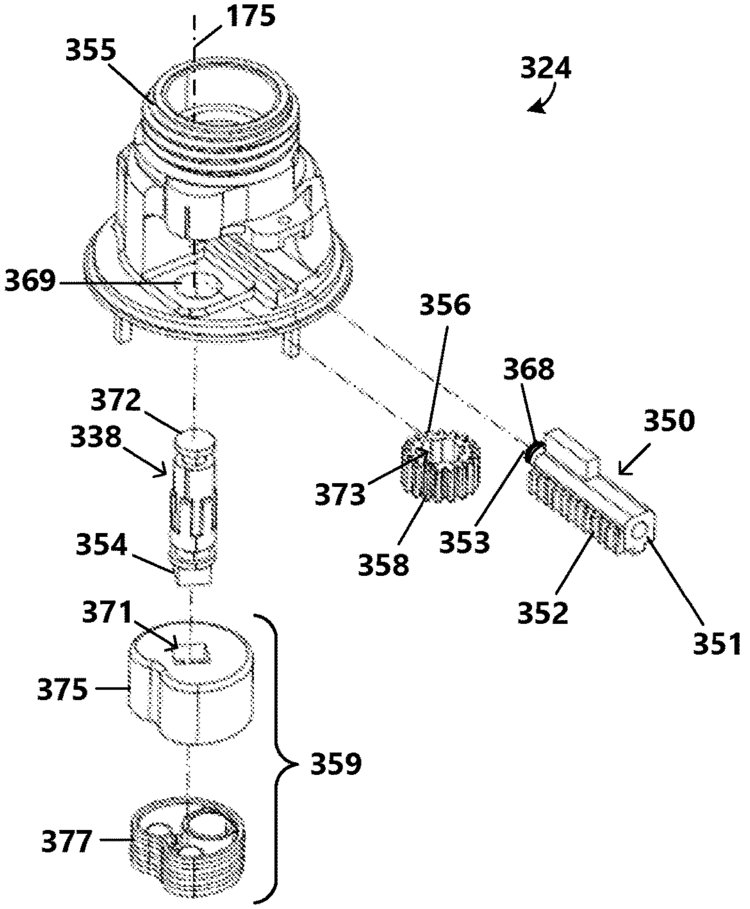
FIG. 30 illustrates a perspective exploded view of the example pathway control stem assembly of FIG. 29.

FIG. 29 illustrates a bottom perspective view of the pathway control stem assembly 324 attached to an embodiment of the stream modulation control 312, wherein the stream modulation control 312 may be configured as a vertical lever or vertical trigger. FIG. 30 illustrates a perspective exploded view of an example embodiment of the pathway control stem assembly 324 configured for operation with the stream modulation control 312 illustrated in FIG. 29. In some examples and as shown, the pathway control stem assembly 324 may include a rack and pinion gear assembly. For example, the stream modulation control 312 may be drivably attached to a first end 351 of a rack 350 that extends from an opening in the spray head housing. A portion of the rack 350 intermediate the first end 351 and a second end 353 of the rack 350 may include a plurality of teeth 352 that are configured to engage and mate with a pinion gear 358. The pinion gear 358 may have a circular shape and may include a plurality of teeth 356 that extend around the periphery of the pinion gear 358. The rack 350 may be configured to drive rotation of the pathway control stem 338 via the pinion gear 358. The pathway control stem 338 and pinion gear 358 may be rotatable about a common vertical axis 175. For example, the pathway control stem 338 may have a generally cylindrical profile configured to be inserted into a central aperture 373 defined in the pinion gear 358. The pathway control stem 338 may have an integrally formed top disk 372, an integrally formed bottom key 354, and a portion between the top disk 372 and the bottom key 354 that may have an outer profile comprising ridges that may correspond with an inner profile of the central aperture 373 of the pinion gear 358.

In some examples, a spring 368 may normally maintain the rack 350 in an unbiased position, which may correspond with the aerated stream 153 or a shower spray 151 output. When the stream modulation control 312 is actuated or depressed by a user with a force greater than the resistance of the spring 368, the stream modulation control 312 may drive the rack 350 in a first direction, which may further drive rotation of the pinion gear 358 and the pathway control stem 338 around the vertical axis 175 in a counterclockwise direction. Additionally, decreasing the force applied to the stream modulation control 312 to a force less than the resistance of the spring 368 may drive movement of the rack 350 in a second direction, which may further drive rotation of the pinion gear 358 and the pathway control stem 338 around the vertical axis 175 in a counter-counterclockwise direction.

As depicted, the pathway control stem assembly 324 may include a housing 355 with an upper externally threaded barrel for attachment to the upper conduit 320 and through which water from the faucet hose 105 may flow. The housing 355 may define an opening 369 within which the top disk 372 of the pathway control stem 338 may be seated. The bottom key 354 of the pathway control stem 338 may be configured to align with and be received by a keyed central aperture 371 defined in the pathway control seal 359. The bottom key 354 may correspond with the keyed central aperture 371, such that rotation of the pathway control stem 338 around the vertical axis 175 may further drive rotation of the pathway control seal 359 around the vertical axis 175.

In some examples, the pathway control seal 359 may be comprised of a seal 377 and a seal holder 375. The seal holder 375 may be configured to mate with the seal 377. In some examples, the seal 377 is of a different material than the seal holder 375. In some examples, the seal 377 is a rubber material and the seal holder 375 is a plastic material.

Figure 31:
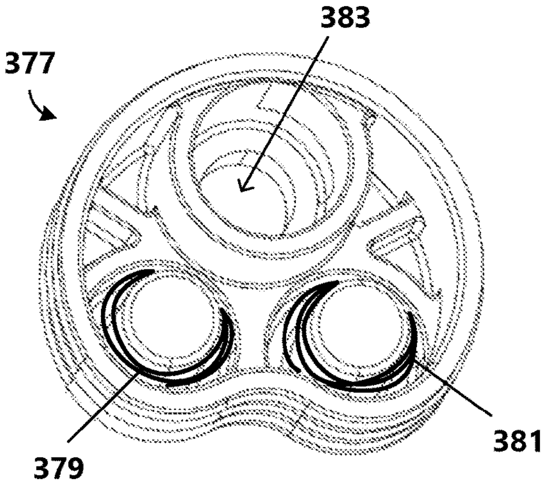
FIG. 31 illustrates a top perspective view of a seal portion of a pathway control seal according to an embodiment of the present disclosure.

FIG. 31 illustrates a top perspective view of the seal 377 of the pathway control seal 359. As depicted, springs 379, 381 may be positioned between the seal 377 and the seal holder 375 and may be configured to exert a downward force onto the seal 377 to provide a sealing surface between the seal 377 and the flow pathway disk assembly 326. Also as depicted, a passage 383 is defined within the seal 377. The passage 383 may be configured to align with one or more openings 328 defined in the flow pathway disk assembly 326. In some examples, when the passage 383 defined in the seal 377 is in alignment with an opening 328 in the flow pathway disk assembly 326 (shown in FIGS. 35-43), the bottom surface of the seal 377 surrounding the passage 383 may cover and seal the other FPD openings 328 that are not in alignment with the passage 383. The FPD openings 328 may therefore be opened or closed by rotating the pathway control stem 338 and pathway control seal 359 via applying an actuation force to the stream modulation control 312, thus directing the water flow between a plurality of flow paths for providing an adjustable stream pattern.

Figure 32:
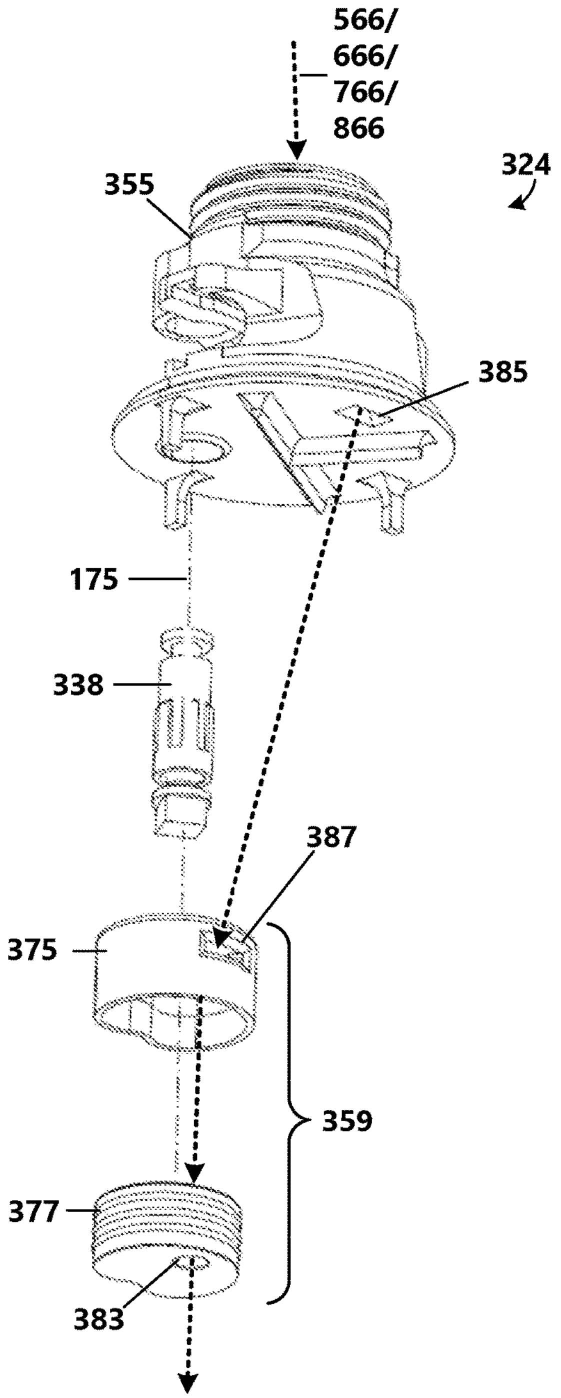
FIG. 32 illustrates another perspective exploded view of the example pathway control stem assembly of FIG. 29, and further shows an example water flow according to an embodiment of the present disclosure.

FIG. 32 illustrates another perspective exploded view of the pathway control stem assembly 324. As depicted, the housing 355 may further include an outlet 385 defined in the bottom surface of the housing 355 through which a water flow 566, 666, 766, 866 may exit. When assembled, a chamber 389 (shown in FIG. 28) may be formed between the housing 355 and an inner profile of the top flow pathway disk 326*a* of the flow pathway disk assembly 326. The pathway control seal 359 may be positioned within the chamber 389. As shown, an inlet 387 may be defined on a side wall of the seal holder 375 of the pathway control seal 359. According to an example, a water flow 566, 666, 766, 866 exiting the housing 355 may be received in the chamber 389, flow into the inlet 387 of the seal holder 375 and further into the pathway control seal 359, and may exit the pathway control seal 359 through the seal passage 383 and into one or more openings 328 in the flow pathway disk assembly 326 that may be in alignment with the seal passage 383.

Figure 33:
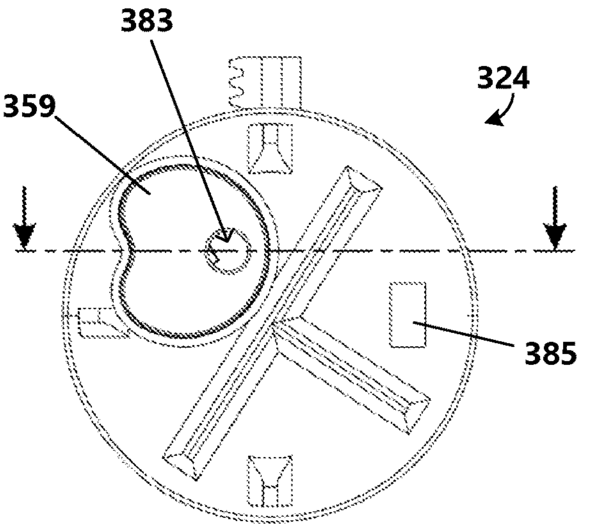
FIG. 33 illustrates a bottom view of the pathway control stem assembly of FIG. 29.
Figure 34:
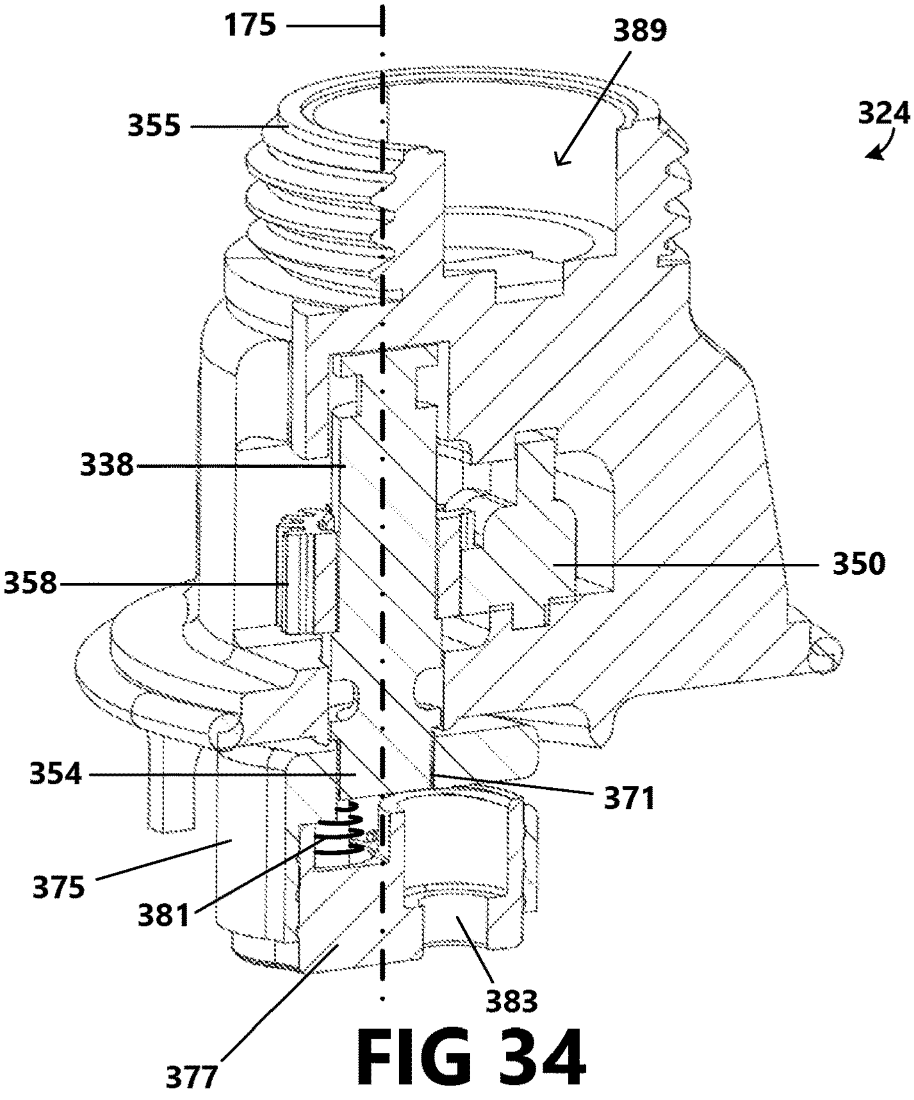
FIG. 34 illustrates a cross-section view of the pathway control stem assembly of FIG. 33.

FIG. 33 illustrates a bottom view of the pathway control stem assembly 324, and FIG. 34 is a cross-section view of the pathway control stem assembly 324 of FIG. 33. As shown in FIG. 34, the pathway control stem 338 is engaged by the pinion gear 358 and the bottom key 354 of the pathway control stem 338 is engaged with the keyed central aperture 371 defined in the pathway control seal 359, such that rotation of the pathway control stem 338 driven by an actuation of the stream modulation control 312 may further drive rotation of the pathway control seal 359 around the vertical axis 175. Additionally, one of the springs 381 positioned between the seal 377 and the seal holder 375 is shown.

Figure 37:
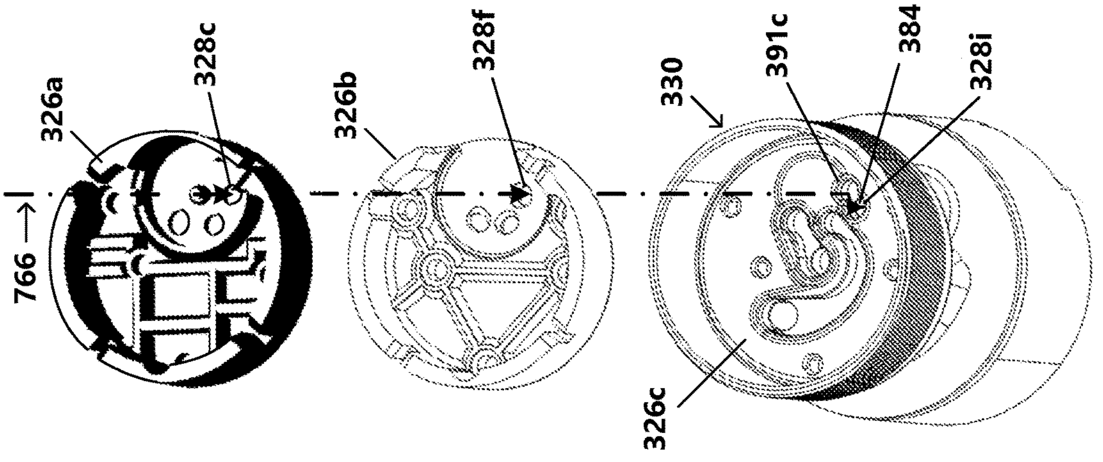
FIG. 37 illustrates a top perspective view of the example flow pathway disk assembly of FIG. 29 and the central manifold, and further shows an example straight beam stream water flow according to an embodiment of the present disclosure.
Figure 36:
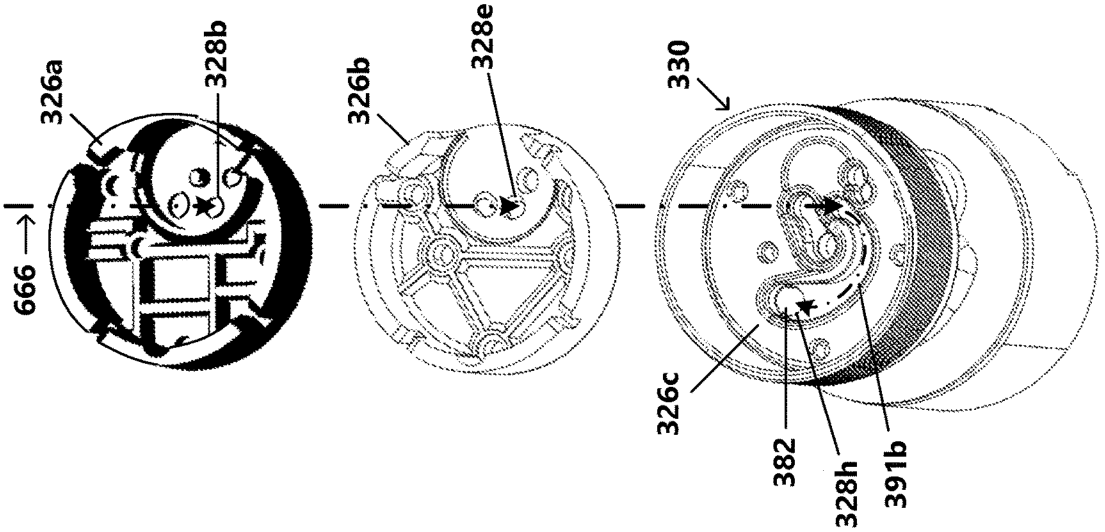
FIG. 36 illustrates a top perspective view of the example flow pathway disk assembly of FIG. 29 and the central manifold, and further shows an example cone stream water flow according to an embodiment of the present disclosure.
Figure 35:
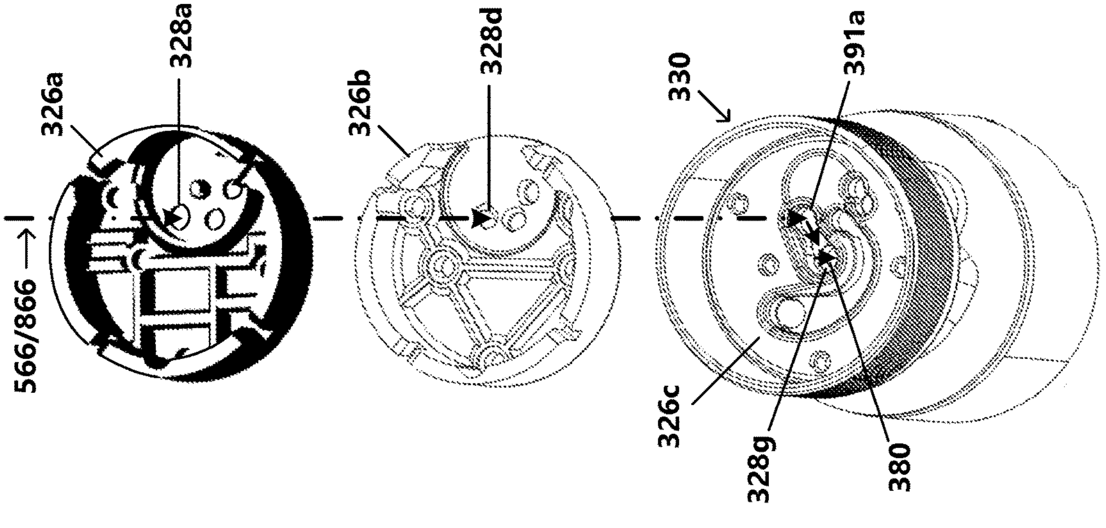
FIG. 35 illustrates a top perspective view of the example flow pathway disk assembly of FIG. 29 and the central manifold, and further shows an example aerated stream or shower spray water flow according to an embodiment of the present disclosure.

FIGS. 35, 36, and 37 illustrate partially exploded top perspective views of the flow pathway disk assembly 326 and the central manifold 330, and different water flows 566, 666, 766, 866 are shown schematically overlaid on the views. The views include the top flow pathway disk 326*a*, the middle flow pathway disk 326*b*, and the bottom flow pathway disk 326*c* shown positioned within an upper externally threaded barrel of the central manifold 330. FIG. 35 shows an aerated stream water flow 566 and a shower spray water flow 866. FIG. 36 shows a cone stream water flow 666, and FIG. 37 shows a straight beam stream water flow 766.

The central manifold 330 may comprise a plurality of ports 380,382,384 that may be defined therethrough: a combined shower spray and aerated stream port 380, a central manifold (CM) cone stream port 382, and a CM straight beam stream port 384. In some examples, the combined shower spray and aerated stream port 380 may be configured to open into the diverter chamber 386 (shown in FIG. 28), which may open into either an aerated stream port 392 or a shower spray port 390 (i.e., based on positioning of the piston 334 within the diverter chamber 386).

As depicted, the openings 328*a-i* included in the flow pathway disk assembly 326 may be defined in the top flow pathway disk 326*a*, the middle flow pathway disk 326*b*, and the bottom flow pathway disk 326*c*. For example, a first opening 328*a* in the top flow pathway disk 326*a* may align with a first opening 328*d* in the middle flow pathway disk 326*b*, which may further align with a first channel 391*a* defined in the bottom flow pathway disk 326*c*, within which a first opening 328*g* may be defined. The first opening 328*g* in the bottom flow pathway disk 326*c* may be configured to align with the combined shower spray and aerated stream port 380 in the central manifold 330. In some examples, when the stream modulation control 312 is in an unbiased position, the pathway control seal 359 may be in a first position where the passage 383 defined in the seal 377 may be aligned with the first opening 328*a* defined in the top flow pathway disk 326*a*. When the seal passage 383 is aligned with the first opening 328*a* in the top flow pathway disk 326*a*, as illustrated in FIG. 35, the aerated stream water flow 566 and the shower spray water flow 866 may flow through the first opening 328*a* in the top flow pathway disk 326*a*, through the first opening 328*d* in the middle flow pathway disk 326*b*, into the first channel 391*a*, and outward through the first opening 328*g* in the bottom flow pathway disk 326*c* into the combined shower spray and aerated stream port 380 in the central manifold 330.

In some examples, a second opening 328*b* in the top flow pathway disk 326*a* may align with a second opening 328*e* in the middle flow pathway disk 326*b*, which may further align with a second channel 391*b* defined in the bottom flow pathway disk 326*c*, within which a second opening 328*h* may be defined. The second opening 328*h* in the bottom flow pathway disk 326*c* may be configured to align with the CM cone stream port 382 in the central manifold 330. In some examples, when the stream modulation control 312 receives an actuation force by the user, the pathway control seal 359 may be rotated into a second position where the passage 383 defined in the seal 377 may be aligned with the second opening 328*b* defined in the top flow pathway disk 326*a*. When the seal passage 383 is aligned with the second opening 328*b* in the top flow pathway disk 326*a*, as illustrated in FIG. 36, the cone stream water flow 666 may flow through the second opening 328*b* in the top flow pathway disk 326*a*, through the second opening 328*e* in the middle flow pathway disk 326*b*, into the second channel 391*b*, and outward through the second opening 328*h* in the bottom flow pathway disk 326*c* into the CM cone stream port 382 in the central manifold 330.

In some examples, a third opening 328*c* in the top flow pathway disk 326*a* may align with a third opening 328*f* in the middle flow pathway disk 326*b*, which may further align with a third channel 391*c* defined in the bottom flow pathway disk 326*c*, within which a third opening 328*i* may be defined. In some examples, when the stream modulation control 312 receives additional actuation force by the user, the pathway control seal 359 may be further rotated into a third position where the passage 383 defined in the seal 377 may be aligned with the third opening 328*c* defined in the top flow pathway disk 326*a*. When the seal passage 383 is aligned with the third opening 328*c* in the top flow pathway disk 326*a*, as illustrated in FIG. 37, the straight beam stream water flow 766 may flow through the third opening 328*c* in the top flow pathway disk 326*a*, through the third opening 328*f* in the middle flow pathway disk 326*b*, into the third channel 391*c*, and outward through the third opening 328*i* in the bottom flow pathway disk 326*c* into the CM straight beam stream port 384 in the central manifold 330.

Figure 38:
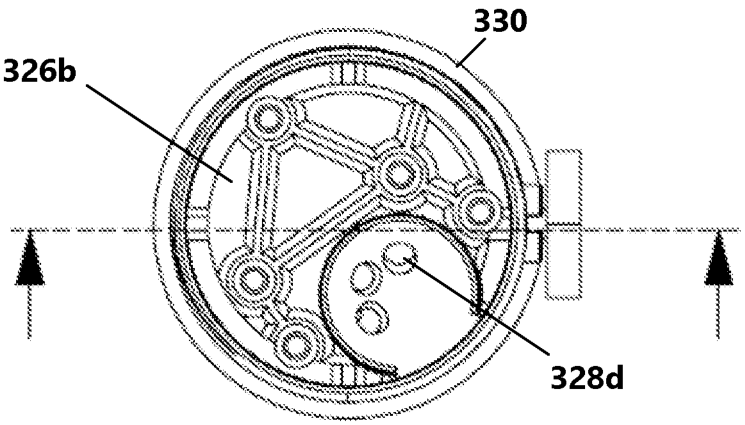
FIG. 38 illustrates a top view of the middle flow pathway disk (positioned above the bottom flow pathway disk) positioned within the central manifold according to an example embodiment of the present disclosure.
Figure 39:
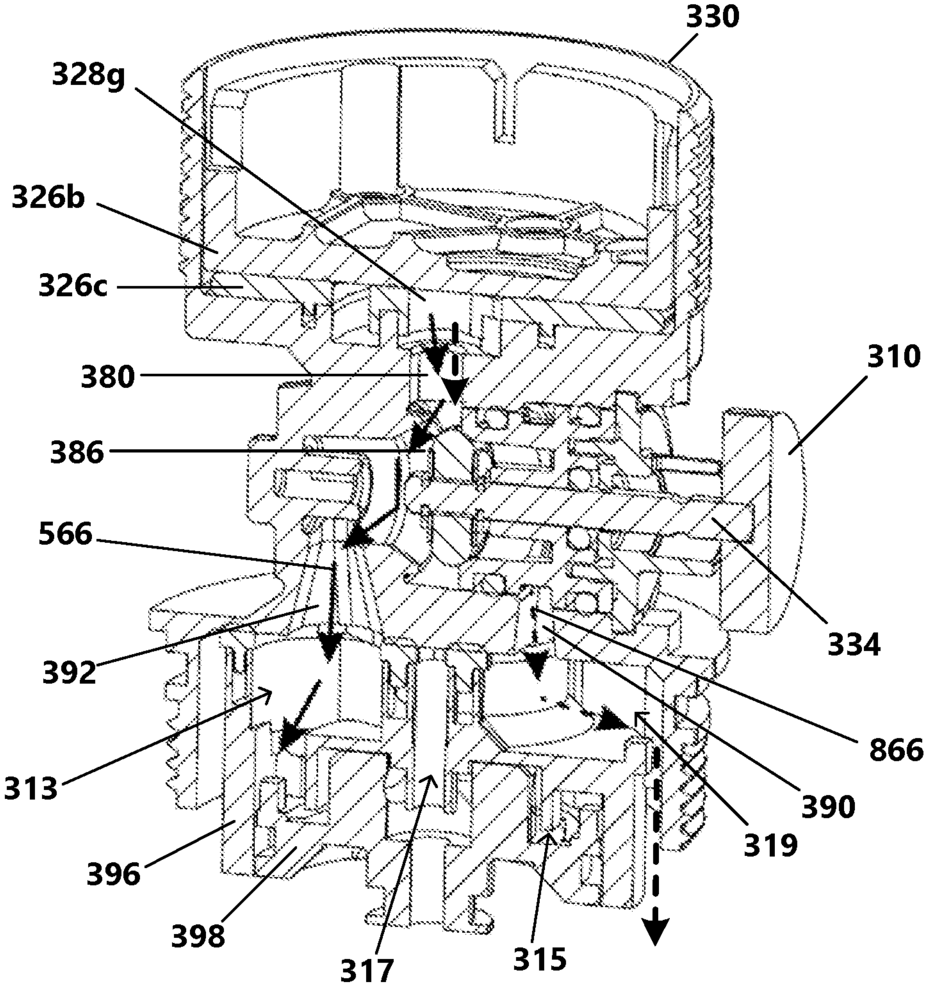
FIG. 39 illustrates a perspective cross-section view of the middle flow pathway disk, bottom flow pathway disk, and the central manifold of FIG. 38, and shows a schematic representation of an aerated stream water flow and a shower spray water flow according to an example embodiment of the present disclosure.

FIG. 38 illustrates a top view of the middle flow pathway disk 326*b* (positioned above the bottom flow pathway disk 326*c*) positioned within the upper barrel of the central manifold 330, and FIG. 39 illustrates a side cross-section view of the middle flow pathway disk 326*b*, bottom flow pathway disk 326*c*, and the central manifold 330 of FIG. 38. As shown, the flow puck 396 and the swirl nozzle 398 may be configured to mate together and to be positioned within a lower externally threaded barrel of the central manifold 330. When the flow puck 396 and the swirl nozzle 398 are mated together, a plurality of flow puck (FP) ports 313, 315, 317, 319 (best shown in FIG. 41) may be defined: an FP aerated stream port 313, an FP cone stream port 315, an FP straight beam stream port 317, and a FP shower spray port 319.

The first opening 328*g* in the bottom flow pathway disk 326*c* may be configured to align with the combined shower spray and aerated stream port 380 defined in the central manifold 330. The diverter chamber 386 may be configured to enter sidelong into the shower spray and aerated stream port 380. Two outlets may be included in the diverter chamber 386: an aerated stream port 392 and a shower spray port 390. In some examples, an outlet of the aerated stream port 392 may be configured to align with an inlet of the FP aerated stream port 313.

The aerated stream water flow 566 and the shower spray water flow 866 are illustrated schematically in FIG. 39: the aerated stream water flow 566 is represented as solid lines, and the shower spray water flow 866 is represented as dashed lines. As depicted, the aerated stream water flow 566 may enter the shower spray and aerated stream port 380 through the first opening 328*g* in the bottom flow pathway disk 326*c*. If an aerated stream 153 output of water is desired by the user, the user may not actuate the mode selection control 310. Thus, the piston 334 may remain in an unbiased position, as illustrated in FIG. 39. When the piston 334 is in the unbiased position, the aerated stream port 392 may be opened and the shower spray port 390 may be closed. Accordingly, the aerated stream water flow 566 may be directed further along an aerated stream flow path through the aerated stream port 392 and into the FP aerated stream port 313 defined between the inner profile of the flow puck 396 and the swirl nozzle 398.

In some examples, the shower spray water flow 866 may enter the shower spray and aerated stream port 380 through the first opening 328*g* in the bottom flow pathway disk 326*c*. If a spray output is desired by the user, the user may depress the mode selection control 310, which may bear against the piston 334, causing the piston 334 to be urged further into the diverter chamber 386 and into a biased position. In the biased position, an end of the piston 334 may close the aerated stream port 392 and uncover/open the shower spray port 390 defined in the central manifold 330. Accordingly, the shower spray water flow 866 is shown redirected along the spray flow path, which may include diverting the shower spray water flow 866 into the shower spray port 390, where it may exit the central manifold 330 and enter the FP shower spray port 319 defined between the outer profile of the flow puck 396 and the inner profile of the lower barrel of the central manifold 330.

Figure 40:
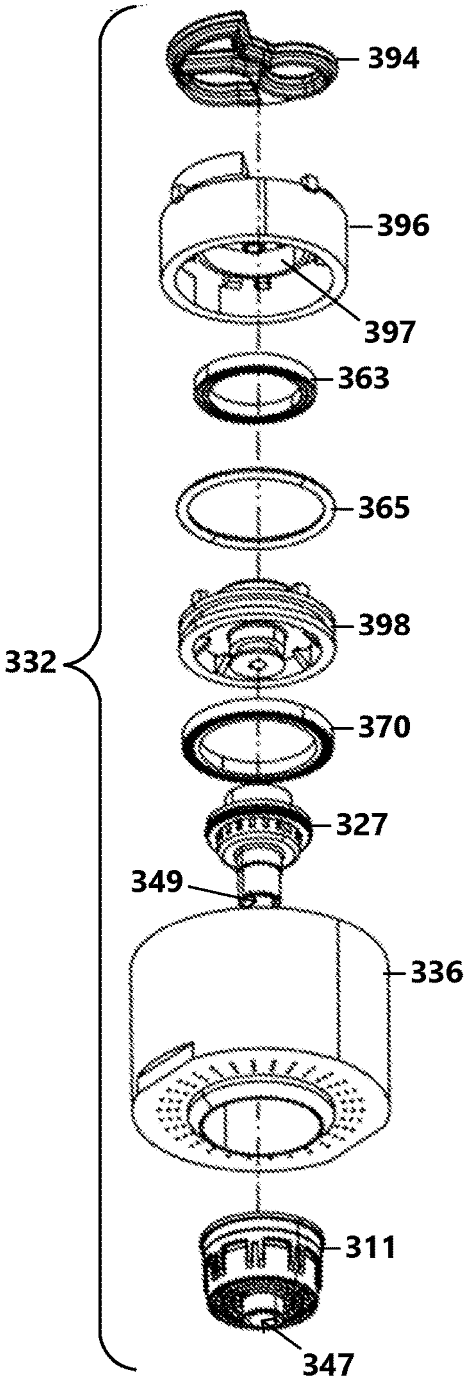
FIG. 40 illustrates a bottom perspective exploded view of an example nozzle assembly according to an embodiment of the present disclosure.

FIG. 40 is a bottom perspective exploded view of the example embodiment of the nozzle assembly 332 illustrated in FIG. 27. For example, FIG. 27 shows the nozzle assembly 332 in a top perspective exploded view, and FIG. 40 shows the bottom perspective exploded view.

Figure 41:
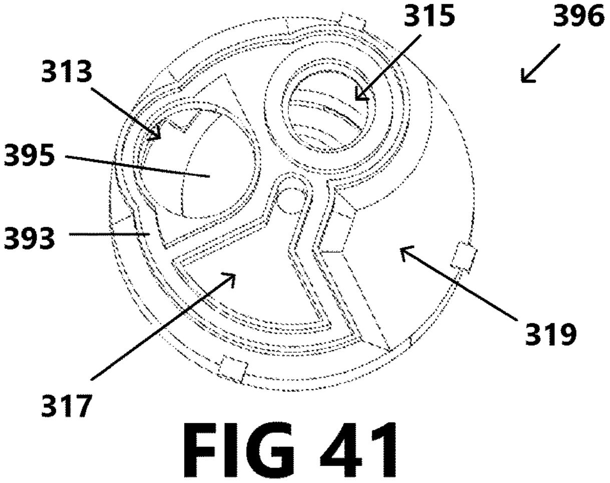
FIG. 41 illustrates a top perspective view of a flow puck included in the example nozzle assembly of FIG. 40 according to an embodiment of the present disclosure.

FIG. 41 is a top perspective view of the flow puck 396 included in the nozzle assembly 332. In some examples, the flow puck seal 394 may be positioned in a channel 393 defined on a top surface of the flow puck 396, and may provide a seal around and between the outlets of the aerated stream port 392, the CM cone stream port 382, and the CM straight beam stream port 384 defined in the central manifold 330 and the inlets of the FP aerated stream port 313, the FP cone stream port 315, the FP straight beam stream port 317, and the FP shower spray port 319 defined in the flow puck 396. According to an aspect, the outlets of the ports defined in the central manifold 330 (i.e., the aerated stream port 392, the CM cone stream port 382, the CM straight beam stream port 384, and the shower spray port 390) may be aligned with inlets of the ports defined in the flow puck 396 (i.e., the FP aerated stream port 313, the FP cone stream port 315, the FP straight beam stream port 317, and the FP shower spray port 319).

In some examples, the flow puck 396 may comprise an inner FP wall 397 that extends downward from the top surface of the flow puck 396 and that is configured to mate with a surface 395 (with the first seal 363 interposed therebetween), which may define the FP aerated stream port 313. For example, the FP aerated stream port 313 may be defined between the outer profile of the inner FP wall 397, the inner profile of the flow puck 396, and the surface 395 of the swirl nozzle 398.

Figure 42:
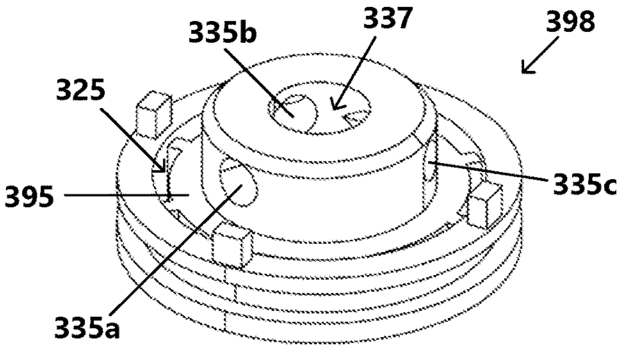
FIG. 42 illustrates a top perspective view of a swirl nozzle included in the example nozzle assembly of FIG. 40 according to an embodiment of the present disclosure.
Figure 43:
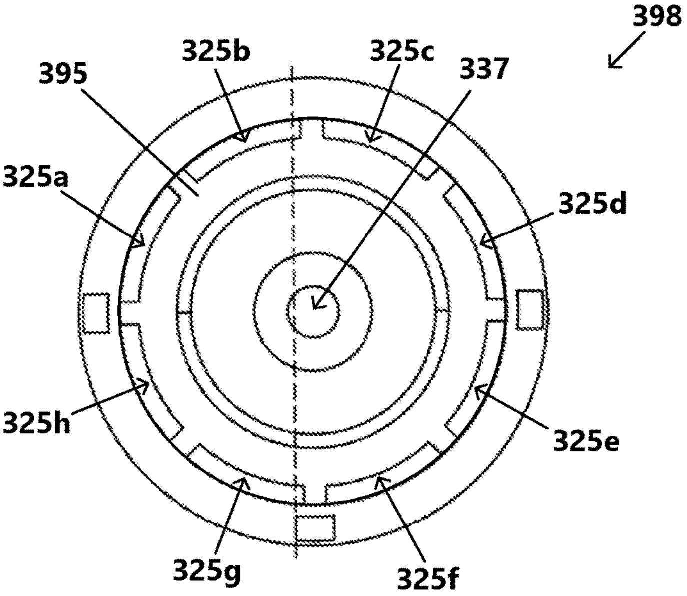
FIG. 43 illustrates a top view of the swirl nozzle of FIG. 42.
Figure 44:
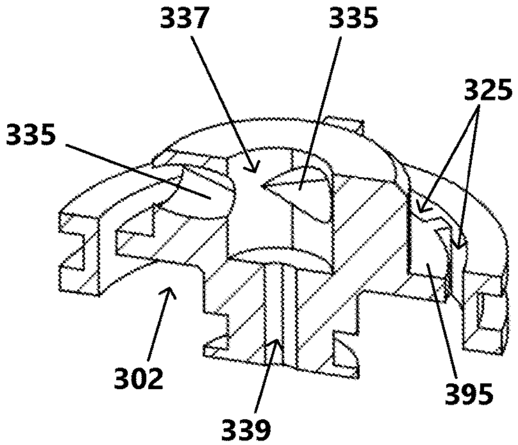
FIG. 44 illustrates a perspective cross-section view of the swirl nozzle of FIG. 43.

FIG. 42 is a top perspective view of the swirl nozzle 398 included in the nozzle assembly 332. FIG. 43 is a top view, and FIG. 44 is a cross-section view of the swirl nozzle 398 of FIG. 43. As shown, a plurality of side inlets 335*a*, 335*b*, 335*c* (generally, 335) may be defined through the outer profile of an upper generally annular portion of the swirl nozzle 398. The side inlets 335 may be configured to open into an upper swirl chamber 337 defined within the inner profile of the swirl nozzle 398, which may be generally cylindrical. According to an aspect, tangential entry of water through the side inlets 335 and into the upper swirl chamber 337 (e.g., for a cone stream) may cause the flow of water to swirl and continue to swirl as it flows through the upper swirl chamber 337 and further through a lower swirl chamber 339 defined within a lower portion of the swirl nozzle 398.

In some examples, a plurality of slots 325*a-h* (generally, 325) may be defined around the perimeter of and through the surface 395 of the swirl nozzle 398. The plurality of slots 325 may allow for a flow of water received in the FP aerated stream port 313 to flow through the swirl nozzle 398 into a first aerator chamber 302 defined between the swirl nozzle 398, the aerator top disk 327, and an inner profile of the third seal 370 interposed between the swirl nozzle 398 and the aerator bottom disk 311.

Figure 45:
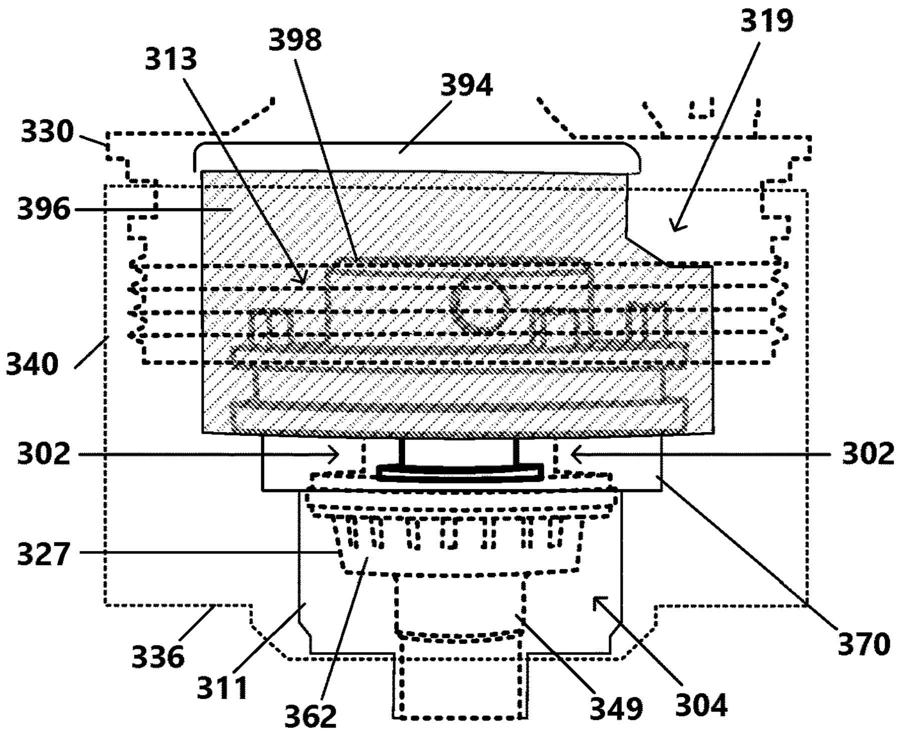
FIG. 45 illustrates a side view of the swirl nozzle positioned in and between the flow puck and an aerator top disk included in the example nozzle assembly according to an embodiment of the present disclosure.
Figure 46:
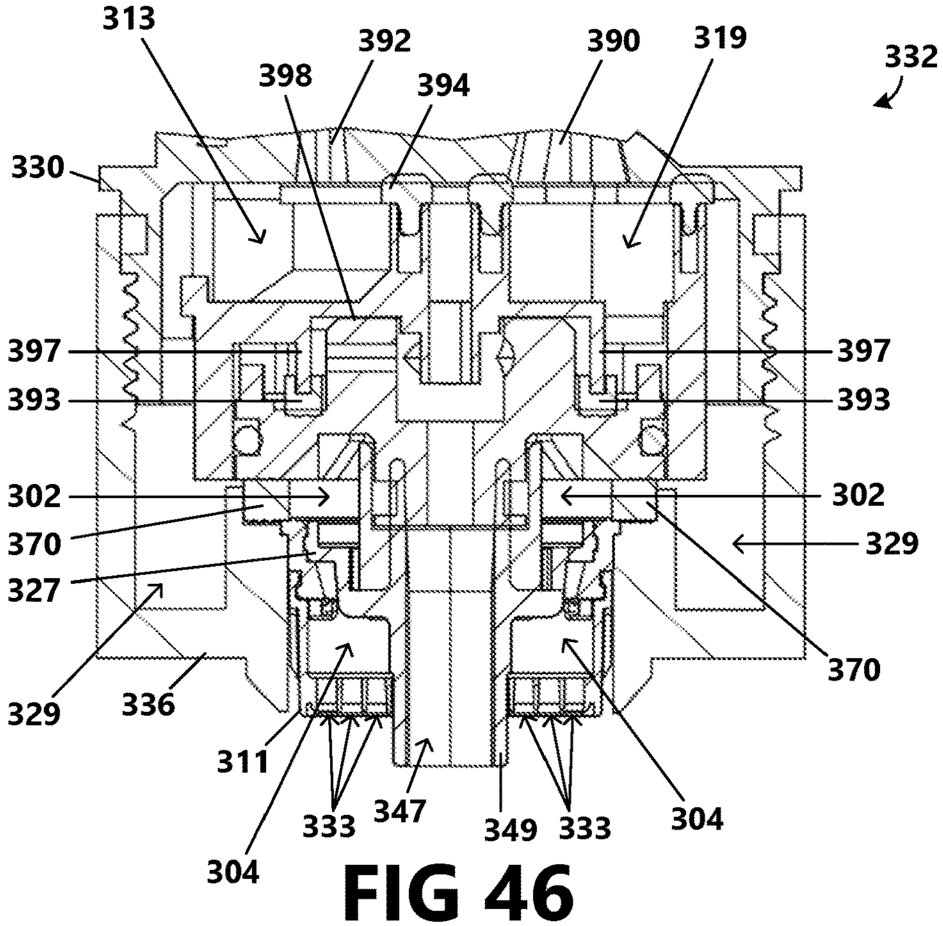
FIG. 46 illustrates a cross-section view of the example nozzle assembly according to an embodiment of the present disclosure.

FIG. 45 includes a side view of the swirl nozzle 398 shown positioned in and between the flow puck 396 (illustrated with hatching) and the aerator top disk 327 (represented by a dashed outline). For example, the lower portion of the swirl nozzle 398 within which the lower swirl chamber 339 is defined may be located within an upper cylindrical barrel of the aerator top disk 327. A top portion of the flow puck 396 is further shown positioned in the externally threaded barrel portion of the central manifold 330 (also represented by a dashed outline), and an outer aerator basin 362 and a nozzle 349 of the aerator top disk 327 are shown positioned in the aerator bottom disk 311 (represented by a solid outline) and an opening 347 thereof.

In some examples, the spray outlet 336 (represented by a dashed outline) may comprise an upper internally threaded barrel 340 for screw on attachment to the central manifold 330. When the spray outlet 336 and the central manifold 330 are attached, a top rim of the aerator bottom disk 311 may be configured to mate with a bottom rim of the swirl nozzle 398 with the third seal 370 interposed between the rims. The first aerator chamber 302 is shown defined between the swirl nozzle 398, the aerator top disk 327, and the inner profile of the third seal 370.

As shown, the outer aerator basin 362 of the aerator top disk 327 may be generally cylindrical and formed around the outer profile of the upper swirl chamber 337. A plurality of top aerator holes 331 may be defined around the outer profile of the outer aerator basin 362. A water flow 566 directed along the aerated stream flow path may exit the first aerator chamber 302 through the plurality of top aerator holes 331 and enter a second aerator chamber 304 defined in the aerator bottom disk 311. The top aerator holes 331 may be designed to break up the water flowing through the faucet into several small streams while introducing air into the water flow 566. The second aerator chamber 304 is shown defined in the aerator bottom disk 311 in a cross-section view of the nozzle assembly 332 illustrated in FIG. 46. In some examples, a plurality of bottom aerator holes 333 may be defined in the aerator bottom disk 311.

Figure 47:
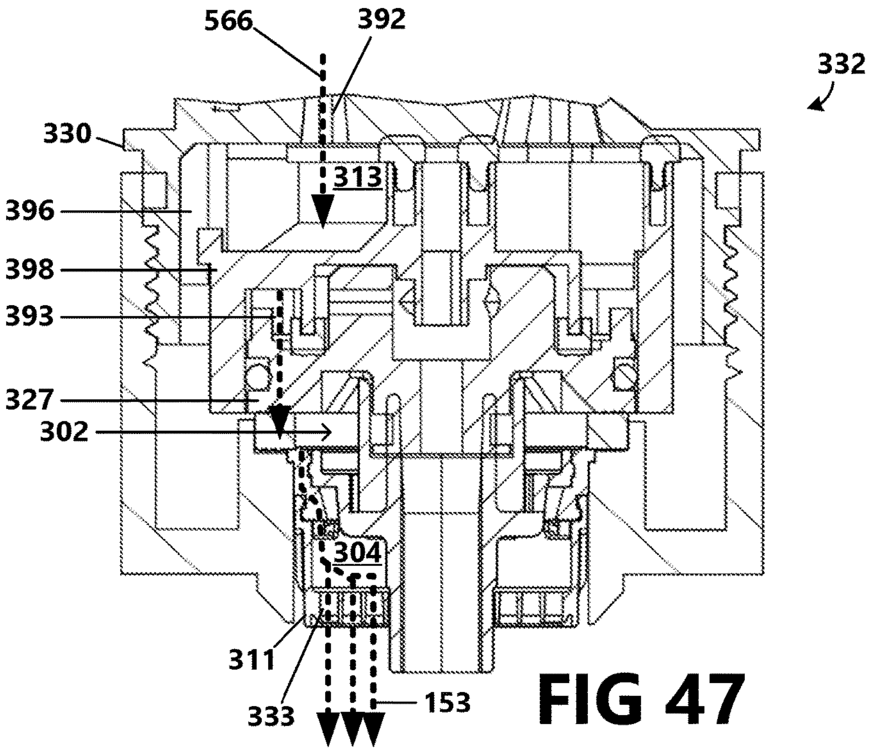
FIG. 47 illustrates a cross-section view of the example nozzle assembly including a schematic representation of an aerated stream water flow through the nozzle assembly according to an embodiment of the present disclosure.

FIG. 47 includes a schematic representation of the aerated stream water flow 566 shown flowing through the nozzle assembly 332 and exiting the spray head 300. For example, the water flow 566 may exit the second aerator chamber 304 and the spray head 300 through the plurality of bottom aerator holes 333 defined in the aerator bottom disk 311 as an aerated stream 153.

Figure 48:
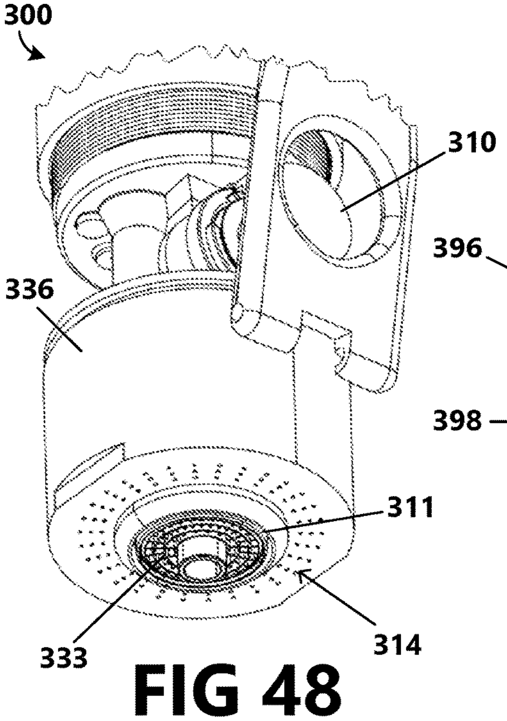
FIG. 48 illustrates a cutaway bottom perspective view of the spray head showing bottom aerator holes through which an aerated stream output may be provided and holes in a spray outlet through which a shower spray output may be provided according to an example embodiment of the present disclosure.

FIG. 48 is a bottom perspective cutaway view of the spray head 300 showing the bottom aerator holes 333 defined in the aerator bottom disk 311. The bottom aerator holes 333 may further break up the water flowing through the faucet into several small streams while introducing additional air into the water flow 566. In some examples, the bottom aerator holes 333 may be smaller than the top aerator holes 331, which may further provide a reduction of water volume with a feel of a higher-pressure flow.

Figure 49:
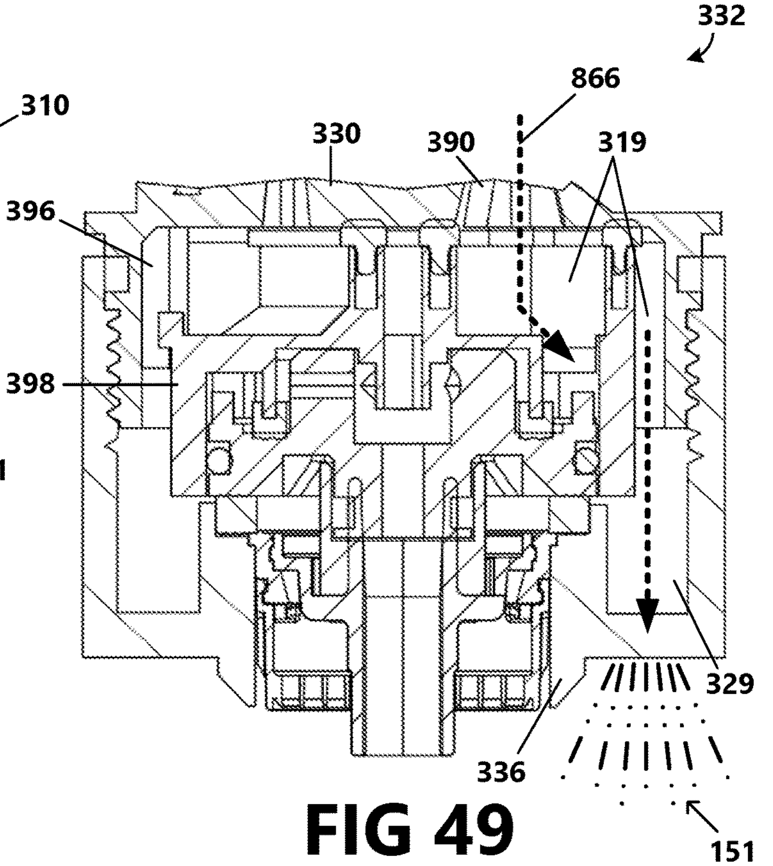
FIG. 49 illustrates a cross-section view of the example nozzle assembly including a schematic representation of a shower spray water flow through the nozzle assembly according to an example embodiment of the present disclosure.

FIG. 49 includes a schematic representation of the shower spray water flow 866 shown flowing through the nozzle assembly 332 and exiting the spray head 300. For example, when the mode selection control 310 is actuated, the shower spray water flow 866 may be directed into the FP shower spray port 319 via the shower spray port 390 defined in the central manifold 330 and may exit the spray head 300 through a plurality of holes (not shown) in the spray outlet 336 at a chamber 329 defined therewith, producing a shower spray 151 as the water flow 866 exits the spray head 300. In some examples and as shown in FIG. 48, the holes 314 may be defined radially along a bottom surface of the spray outlet 336.

Figure 50:
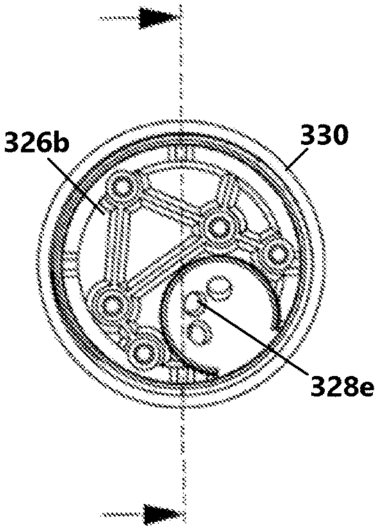
FIG. 50 illustrates a top view of the middle flow pathway disk (positioned above the bottom flow pathway disk) positioned within the central manifold according to an example embodiment of the present disclosure.
Figure 51:
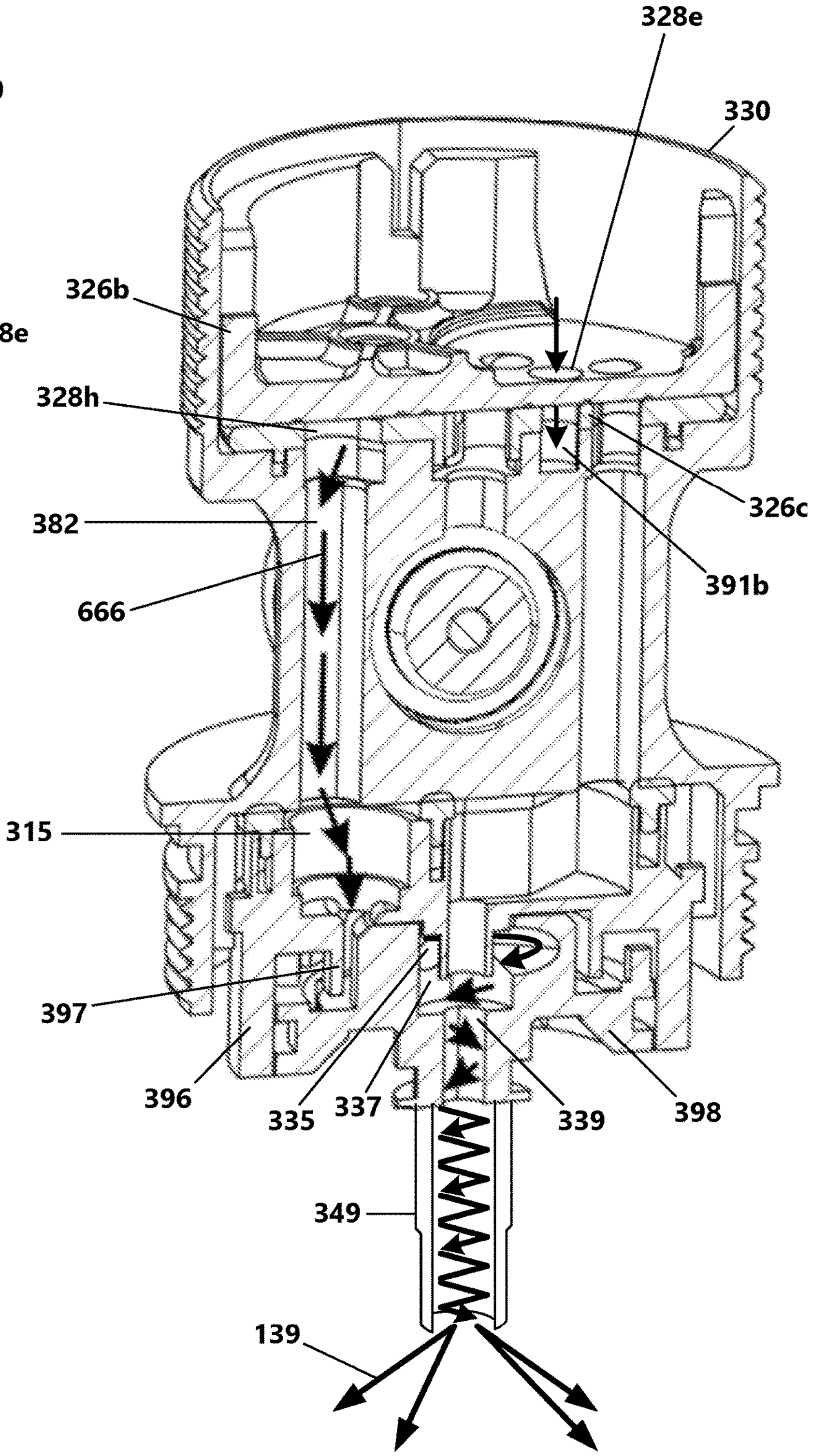
FIG. 51 illustrates a perspective cross-section view of the middle flow pathway disk, bottom flow pathway disk, and the central manifold of FIG. 50, and shows a schematic representation of a cone stream water flow according to an embodiment of the present disclosure.

FIG. 50 illustrates a top view of the middle flow pathway disk **326*b* (positioned above the bottom flow pathway disk 326*c*) positioned within the upper barrel of the central manifold 330, and FIG. 51 includes a schematic representation of the cone stream water flow 666 and a perspective cross-section view of the middle flow pathway disk 326*b*, the bottom flow pathway disk 326*c*, and the central manifold 330 of FIG. 50. The perspective cross-section view illustrated in FIG. 51 further includes the flow puck 396, the swirl nozzle 398, and the nozzle 349 of the aerator top disk 327. As shown, the cone stream water flow 666 may exit the bottom flow pathway disk 326*c* through the second opening 328*h* and flow through the CM cone stream port 382 defined in the central manifold 330**.

In some examples, the downward extending inner FP wall 397 in the flow puck 396 may further define the FP cone stream port 315 in the flow puck 396. The cone stream water flow 666 may exit the CM cone stream port 382 into the FP cone stream port 315 defined in the flow puck 396, and further through the plurality of side inlets 335 defined in the upper portion of the swirl nozzle 398 into the upper swirl chamber 337. According to an aspect, tangential entry of the cone stream water flow 666 into the upper swirl chamber 337 via the side inlets 335 may cause the cone stream water flow 666 to swirl as it flows through the upper swirl chamber 337 and further through the lower swirl chamber 339 and the nozzle 349 of the aerator top disk 327. As the cone stream water flow 666 exits the nozzle 349, the swirling motion of the water may produce a cone stream 139 as depicted in FIG. 51.

Figure 52:
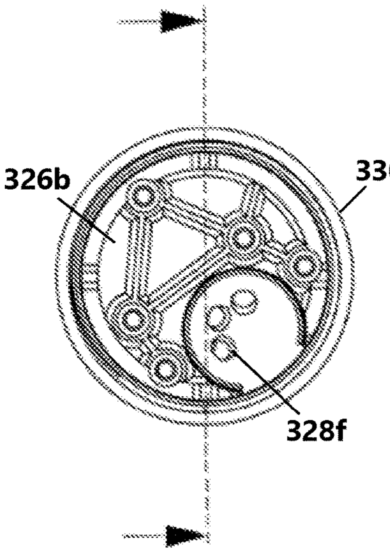
FIG. 52 illustrates a top view of the middle flow pathway disk (positioned above the bottom flow pathway disk) positioned within the central manifold according to an example embodiment of the present disclosure.
Figure 53:
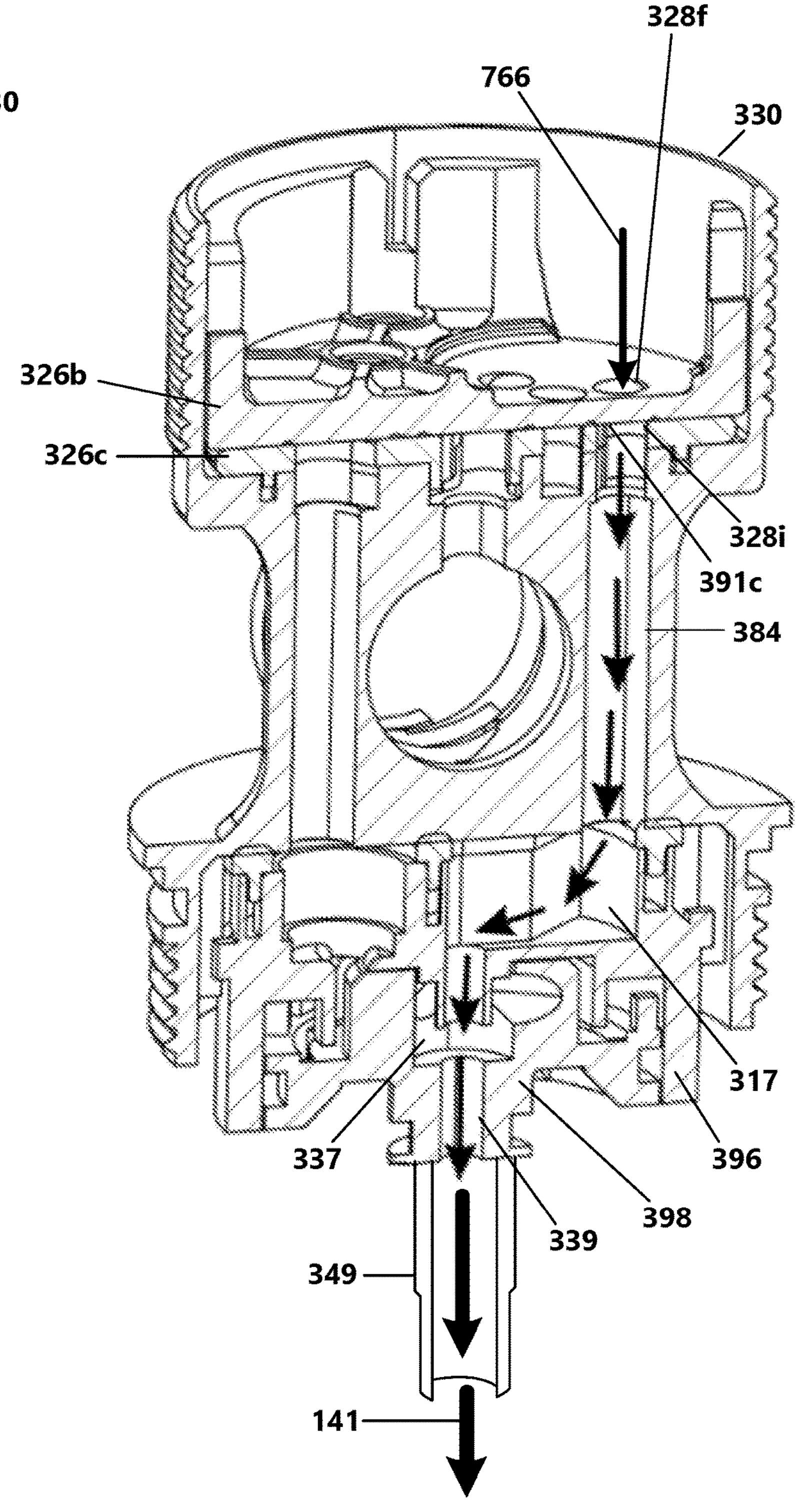
FIG. 53 illustrates a perspective cross-section view of the middle flow pathway disk, bottom flow pathway disk, and the central manifold of FIG. 52, and shows a schematic representation of a straight beam stream water flow according to an example embodiment of the present disclosure.

FIG. 52 illustrates a top view of the middle flow pathway disk **326*b* (positioned above the bottom flow pathway disk 326*c*) positioned within the upper barrel of the central manifold 330, and FIG. 53 includes a schematic representation of the straight beam stream water flow 766 and a perspective cross-section view of the middle flow pathway disk 326*b*, the bottom flow pathway disk 326*c*, and the central manifold 330 of FIG. 52. The perspective cross-section view illustrated in FIG. 53 further includes the flow puck 396, the swirl nozzle 398, and the nozzle 349 of the aerator top disk 327. As shown, the straight beam stream water flow 766 may flow through the third opening 328*f* in the middle flow pathway disk 326*b* and the third opening 328*i* in the bottom flow pathway disk 326*c*, and may enter and flow through the CM cone stream port 382 in the central manifold 330. As shown, the straight beam stream water flow 766 may exit the CM cone stream port 382 and into the FP straight beam stream port 317 defined in the flow puck 396. As shown, an outlet of the FP straight beam stream port 317 in the flow puck 396 may be aligned with the upper swirl chamber 337. Accordingly, the straight beam stream water flow 766 may be directed to flow straight downward through the upper swirl chamber 337 and the lower swirl chamber 339 of the swirl nozzle 398. The straight beam stream water flow 766 may further flow straight downward through the nozzle 349 of the aerator top disk 327. As the straight beam stream water flow 766 exits the nozzle 349, the straight downward flow of the water may produce a straight beam stream 141 as depicted in FIG. 53**.

In some examples, a mixed stream output may be desired or may be provided as a water flow is modulated between an aerated stream 153, a cone stream 139, and/or a straight beam stream 141. For example, the user may actuate the stream modulation control 312 with an amount of force and/or to a position where the pathway control seal 359 may be rotated into a position where the passage 383 defined in the seal 377 may be aligned with portions of two openings in the top flow pathway disk **326*a*: the first FPD opening 328*a* corresponding with an aerated stream and the second FPD opening 328*b* corresponding with a cone stream; or the second FPD opening 328*b* corresponding with a cone stream and the third FPD opening 128*c*** corresponding with a straight beam stream.

Figure 54:
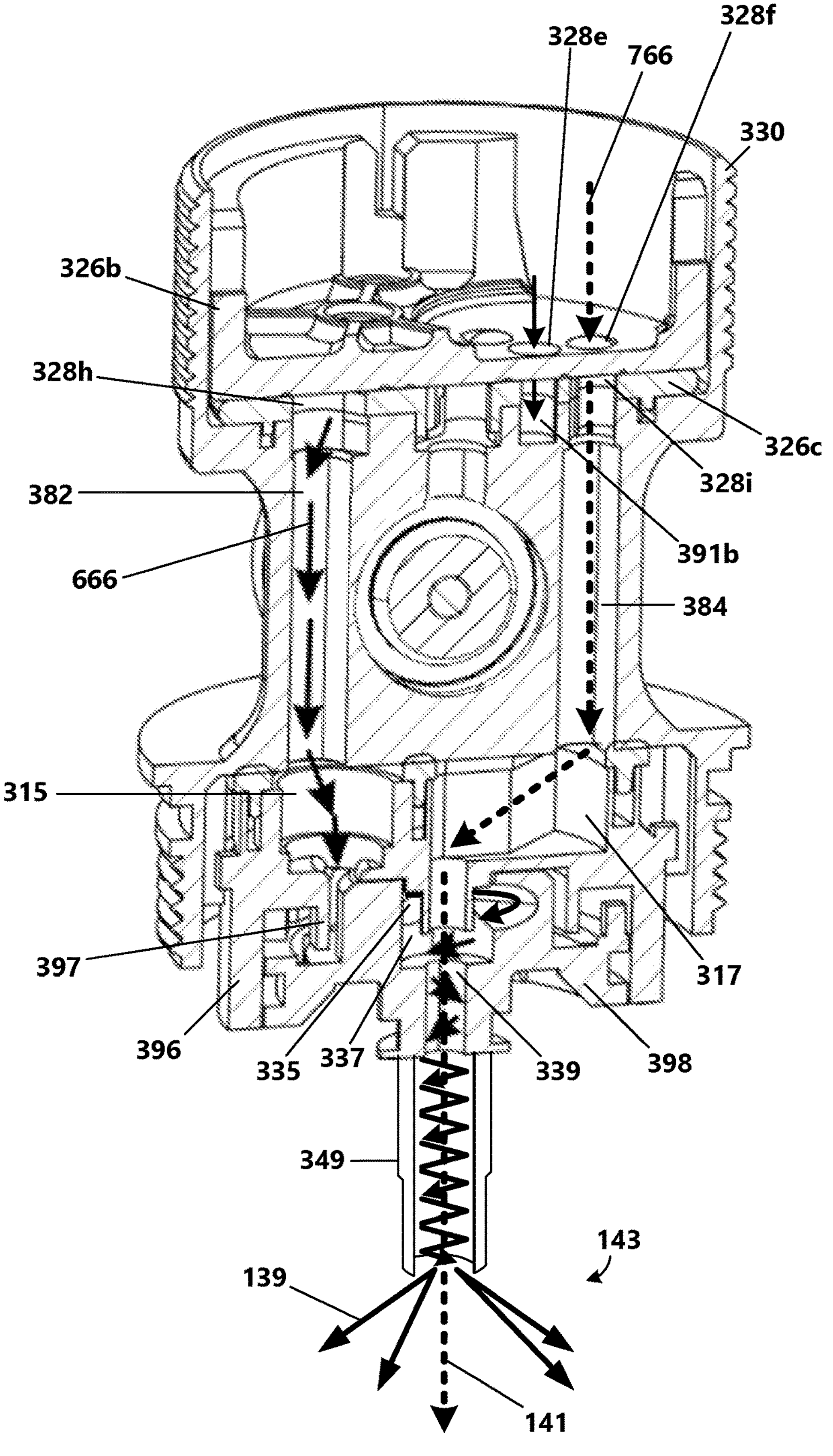
FIG. 54 illustrates a perspective cross-section view of the middle flow pathway disk, bottom flow pathway disk, and the central manifold, and shows a schematic representation of a mixed stream output according to an example embodiment of the present disclosure.

Accordingly, and as illustrated in FIG. 54, when a water flow exits the pathway control seal 359 and enters both the second FPD opening **328*b* and the third FPD opening 328*c* in the top flow pathway disk 326*a*, the water flow may be is split into two water flows 666, 766. One water flow 666 may follow the cone stream path (e.g., through the second opening 328***e* in the middle flow pathway disk 326*b*, into the second channel 391*b* and outward through the second opening 328*h* in the bottom flow pathway disk 326*c*, through the CM cone stream port 382 in the central manifold 330, into the FP cone stream port 315 defined in the flow puck 396, tangentially through the plurality of side inlets 335 defined in the swirl nozzle 398 into the upper swirl chamber 337, through the lower swirl chamber 339, and through the nozzle 349 of the aerator top disk 327), producing a cone stream 139 as the cone stream water flow 666 exits the nozzle 349. The other water flow 766 may follow the straight beam path (e.g., through the third opening 328*f* in the middle flow pathway disk 326*b*, into the third channel 391*c* and outward through the third opening 328*i* in the bottom flow pathway disk 326*c*, through the CM straight beam stream port 384 in the central manifold 330, into the FP straight beam stream port 317 defined in the flow puck 396, straight downward through the upper swirl chamber 337 and the lower swirl chamber 339 of the swirl nozzle 398, and straight downward through the nozzle 349 of the aerator top disk 327), producing a straight beam stream 141 as the straight beam stream water flow 766 exits the nozzle 349. Accordingly, a mixed stream 143 output may be provided. In other examples, when the passage 383 defined in the seal 377 is aligned with the first FPD opening 328*a* and the second FPD opening 328*b*, a mixed stream output including an aerated stream 153 and a cone stream 139 may be provided.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention

We claim:

1. A spray head for connection to a faucet for expelling water, comprising:

a stream modulation control configured in a normally unactuated position;

a mode selection control configured in a normally unbiased position;

an aerator stream flow path configured to receive a water flow and produce an aerated stream as the water flow exits the spray head;

a cone stream flow path configured to receive the water flow in response to a first actuation force applied to the stream modulation control, and produce a cone stream as the water flow exits the spray head;

a straight beam stream flow path configured to receive the water flow in response to a second actuation force applied to the stream modulation control, wherein the second actuation force is greater than the first actuation force, and produce a straight beam stream as the water flow exits the spray head, and a shower spray flow path configured to receive the water flow in response to the mode selection control being moved to a biased position when the stream modulation control is in the unactuated position, and produce a shower spray as the water flow exits the spray head.

2. The spray head of claim 1, wherein:

the aerator stream flow path comprises an aerator subassembly within which a plurality of aerator holes are defined that are configured to break the water flow into a plurality of small water streams and introduce air into the water flow;

the cone stream flow path comprises a swirl nozzle within which a plurality of side inlets are defined that are configured to receive tangential entry of the water flow into a swirl chamber, causing the water flow to swirl to produce the cone stream;

the straight beam stream flow path comprises the swirl nozzle within which the swirl chamber is configured to receive entry of the water flow straight downward and allow exit of the water flow straight downward through a nozzle to produce the straight beam stream; and the shower spray flow path comprises a spray outlet within which a plurality of holes are defined that are configured to produce a shower spray output.

3. The spray head of claim 2, further comprising:

a pathway control stem assembly configured to rotate around a vertical axis;

a pathway control seal rotatably attached to the pathway control stem, the pathway control seal having an inlet configured to receive the water flow and a passage configured to allow the water flow to exit the pathway control seal;

a flow pathway disk assembly comprising:

- a first opening corresponding with the aerator stream flow path and the shower spray flow path, wherein when the stream modulation control is in the normally unactuated position, the pathway control stem and the pathway control seal are in a first position where the passage of the pathway control seal is aligned with the first opening in the flow pathway disk assembly;
- a second opening corresponding with the cone stream flow path, wherein in response to the first actuation force applied to the stream modulation control, the pathway control stem and the pathway control seal are rotated to a second position where the passage of the pathway control seal is aligned with the second opening in the flow pathway disk assembly; and
- a third opening corresponding with the straight beam stream flow path, wherein in response to the second actuation force applied to the stream modulation control, the pathway control stem and the pathway control seal are rotated to a third position where the passage of the pathway control seal is aligned with the third opening in the flow pathway disk assembly; and a central manifold positioned between the flow pathway disk assembly and a nozzle assembly, the central manifold comprising:

- a combined shower spray and aerated stream port for receiving the water flow via the first opening in the flow pathway disk assembly;
- a cone stream port for receiving the water flow via the second opening in the flow pathway disk assembly;
- a straight beam stream port for receiving the water flow via the third opening in the flow pathway disk assembly;

an aerated stream port for receiving the water flow received in the combined shower spray and aerated stream port; and a diverter chamber configured to receive a piston connected to the mode selection control and configured to close the aerated stream port and open a shower spray port when the mode selection control is moved to the biased position;

the shower spray port configured for receiving the water flow received in the combined shower spray and aerated stream port when the mode selection control is in the biased position; and the nozzle assembly comprising:

the swirl nozzle;

the nozzle;

the aerator subassembly; and the spray outlet.

4. The spray head of claim 1, further comprising:

a pathway control stem assembly configured to rotate around a vertical axis; and a pathway control seal rotatably attached to the pathway control stem, the pathway control seal having an inlet configured to receive the water flow and a passage configured to allow the water flow to exit the pathway control seal.

5. The spray head of claim 1, further comprising a flow pathway disk assembly comprising:

a first opening corresponding with the aerator stream flow path and the shower spray flow path, wherein when the stream modulation control is in the normally unactuated position, a pathway control stem and a pathway control seal are in a first position where the passage of the pathway control seal is aligned with the first opening in the flow pathway disk assembly;

a second opening corresponding with the cone stream flow path, wherein in response to the first actuation force applied to the stream modulation control, the pathway control stem and the pathway control seal are rotated to a second position where a passage of the pathway control seal is aligned with the second opening in the flow pathway disk assembly; and a third opening corresponding with the straight beam stream flow path, wherein in response to the second actuation force applied to the stream modulation control, the pathway control stem and the pathway control seal are rotated to a third position where the passage of the pathway control seal is aligned with the third opening in the flow pathway disk assembly.

6. The spray head of claim 4, further comprising a central manifold positioned between a flow pathway disk assembly and a nozzle assembly, the central manifold comprising:

a combined shower spray and aerated stream port for receiving the water flow via a first opening in the flow pathway disk assembly;

a cone stream port for receiving the water flow via a second opening in the flow pathway disk assembly;

a straight beam stream port for receiving the water flow via a third opening in the flow pathway disk assembly;

an aerated stream port for receiving the water flow received in the combined shower spray and aerated stream port; and a diverter chamber configured to receive a piston connected to the mode selection control and configured to close the aerated stream port and open a shower spray port when the mode selection control is moved to the biased position;

the shower spray port configured for receiving the water flow received in the combined shower spray and aerated stream port when the mode selection control is in the biased position.

7. The spray head of claim 1, further comprising a nozzle assembly comprising:

a swirl nozzle;

a nozzle;

an aerator subassembly; and a spray outlet.

8. The spray head of claim 7, wherein:

the swirl nozzle comprises a plurality of side inlets configured to open into a swirl chamber; and tangential entry of the water flow through the plurality of side inlets into the swirl chamber causes the water flow to swirl and produce the cone stream.

9. The spray head of claim 1, wherein:

the mode selection control is a button; and the stream modulation control defines an opening through which the mode selection control is exposed.

10. A spray head for connection to a faucet for expelling water, comprising:

a spray head housing comprising an inlet, an outlet, and an intermediate section positioned between and in fluid communication with the inlet and the outlet;

a movable pathway control stem attached to a pathway control seal, the pathway control seal having an inlet configured to receive a water flow and a passage configured to allow the water flow to exit the pathway control seal;

a flow pathway disk assembly comprising:

a first opening corresponding with an aerated stream flow path and a shower spray flow path;

a second opening corresponding with a cone stream flow path; and a third opening corresponding with a straight beam stream flow path;

a first control for selection between a shower spray mode for expelling a shower spray of water and a modulated stream mode for expelling a stream of water;

a second control for modulating between patterns of the stream of water when in the modulated stream mode, the second control configured to receive an actuation force from a user, wherein the actuation force causes the second control to drive movement of the pathway control stem and the pathway control seal to:

a first position where the passage of the pathway control seal is aligned with the first opening in the flow pathway disk assembly;

a second position where the passage of the pathway control seal is aligned with the second opening in the flow pathway disk assembly; or a third position where the passage of the pathway control seal is aligned with the third opening in the flow pathway disk assembly;

a central manifold positioned between the flow pathway disk assembly and a nozzle assembly, the central manifold comprising:

a first port for receiving the water flow via the first opening in the flow pathway disk assembly;

a second port for receiving the water flow via the second opening in the flow pathway disk assembly;

a third port for receiving the water flow via the third opening in the flow pathway disk assembly;

a fourth port for receiving the water flow received in the first port when the first control is in an unbiased position;

a diverter chamber configured to receive a piston connected to the first control, wherein actuation of the first control to a biased position causes the piston to close the fourth port and open a fifth port; and the fifth port configured to receive the water flow received in the first port when the first control is in the biased position; and the nozzle assembly comprising:

a swirl nozzle for producing a cone stream as the water flow received via the second port in the central manifold exits the outlet of the spray head;

a nozzle for producing a straight beam stream as the water flow received via the third port in the central manifold exits the outlet of the spray head;

an aerator subassembly for producing an aerated stream as the water flow received via the fourth port in the central manifold exits the outlet of the spray head; and a spray outlet for producing a shower spray as the water flow received via the fifth port in the central manifold exits the outlet of the spray head.

11. The spray head of claim 10, wherein, based on the actuation force, the second control is further configured to drive movement of the pathway control stem and the pathway control seal to:

a position intermediate the first position and the second position to provide a mixed stream output comprising the aerated stream and the cone stream; or a position intermediate the second position and the third position to provide a mixed stream output comprising the cone stream and the straight beam stream.

12. The spray head of claim 10, wherein the second control is configured to drive rotation of the pathway control stem and the pathway control seal around a vertical axis using a rack and pinion gear assembly attached to the second control and the pathway control stem.

13. The spray head of claim 10, wherein the second control is a lever.

14. The spray head of claim 13, wherein:

the first control is a button; and the second control defines an opening through which the first control is exposed.

15. The spray head of claim 10, wherein:

the swirl nozzle comprises a plurality of side inlets configured to open into a swirl chamber; and tangential entry of the water flow through the plurality of side inlets into the swirl chamber causes the water flow to swirl and produce the cone stream.

16. The spray head of claim 10, wherein the pathway control seal comprises:

a seal constructed of a rubber material; and a seal holder constructed of a plastic material.

17. The spray head of claim 16, further comprising at least one spring positioned between the seal and the seal holder to exert a downward force onto the seal and provide a sealing surface between the seal and the flow pathway disk assembly.

* * * * *